United States Patent
Gabriel et al.

(10) Patent No.: US 9,328,219 B2
(45) Date of Patent: May 3, 2016

(54) POLYAMIDE COMPOSITIONS WITH IMPROVED OPTICAL PROPERTIES

(71) Applicant: BASF SE, Ludwigshafen (DE)

(72) Inventors: Claus Gabriel, Griesheim (DE); Florian Richter, Burgkunstadt (DE); Hye Jin Park, Ludwigshafen (DE); Rainer Xalter, Heidelberg (DE); Hans-Werner Schmidt, Bayreuth (DE)

(73) Assignee: BASF SE (DE)

( * ) Notice: Subject to any disclaimer, the term of this patent is extended or adjusted under 35 U.S.C. 154(b) by 238 days.

(21) Appl. No.: 13/847,752

(22) Filed: Mar. 20, 2013

(65) Prior Publication Data

US 2013/0251929 A1    Sep. 26, 2013

Related U.S. Application Data

(60) Provisional application No. 61/612,996, filed on Mar. 20, 2012.

(51) Int. Cl.
*C08K 5/21*    (2006.01)

(52) U.S. Cl.
CPC ............. *C08K 5/21* (2013.01); *Y10T 428/139* (2015.01); *Y10T 428/1352* (2015.01)

(58) Field of Classification Search
CPC .................................. C08K 5/21; C08L 77/00
USPC ........................................................ 524/212
See application file for complete search history.

(56) References Cited

U.S. PATENT DOCUMENTS

| | | | |
|---|---|---|---|
| 4,203,916 A | 5/1980 | Zengel et al. |
| 4,325,863 A | 4/1982 | Hinsken et al. |
| 4,338,244 A | 7/1982 | Hinsken et al. |
| 5,175,312 A | 12/1992 | Dubs et al. |
| 5,216,052 A | 6/1993 | Nesvadba et al. |
| 5,252,643 A | 10/1993 | Nesvadba |
| 5,356,966 A | 10/1994 | Nesvadba |
| 5,367,008 A | 11/1994 | Nesvadba |
| 5,428,162 A | 6/1995 | Nesvadba |
| 5,428,177 A | 6/1995 | Nesvadba |
| 5,488,117 A | 1/1996 | Nesvadba |

FOREIGN PATENT DOCUMENTS

| | | | |
|---|---|---|---|
| DE | 2710595 A1 | 9/1978 | |
| DE | 4316611 A1 | 11/1993 | |
| DE | 4316622 A1 | 11/1993 | |
| DE | 4316876 A1 | 11/1993 | |
| EP | 0589839 A1 | 3/1994 | |
| EP | 0591102 A1 | 4/1994 | |
| JP | 05-320501 | * 12/1993 | ............. C08L 77/00 |
| JP | 5320501 A | 12/1993 | |
| JP | 2003064047 A | 3/2003 | |
| JP | 2007051290 A | 3/2007 | |
| WO | WO-2004072168 A2 | 8/2004 | |

OTHER PUBLICATIONS

Machine translation of JP 05-320501. Dec. 1993.*
International Search Report and the Written Opinion of the International Searching Authority for PCT/EP2013/055718, mailing date May 8, 2013.
Journal fuer Praktische Chemie, vol. 91, (1915), pp. 1-38.
Van Esch, Jan, et al., "Self-Assembly of Bisurea Compounds in Organic Solvents and on Solid Substrates", Chem. Eur. J., vol. 3, No. 8, (1997), pp. 1238-1243.
U.S. Appl. No. 13/847,801, Gabriel et al.
English translation of JP2007051290, Mar. 2007.

* cited by examiner

*Primary Examiner* — John Uselding
(74) *Attorney, Agent, or Firm* — Drinker Biddle & Reath LLP

(57) ABSTRACT

The present invention relates to a polymer composition comprising at least one polyamide and at least one urea compound of the formula I

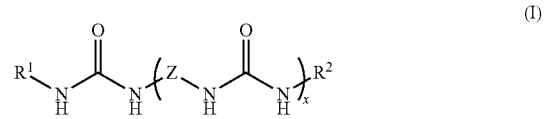

(I)

where x is 1, 2 or 3; $R^1$ and $R^2$ are selected from hydrogen, linear $C_1$-$C_7$-alkyl, branched $C_3$-$C_{10}$-alkyl, unsubstituted or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl; and Z is selected from $C_3$-$C_{10}$-alkanediyl, unsubstituted or substituted arylene, unsubstituted or substituted aryl unsubstituted or substituted ene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cycloalkylene, $C_5$-$C_8$-cycloalkylene-$C_1$-$C_4$-alkylene-$C_5$-$C_8$-cycloalkylene, unsubstituted or substituted heterocycloalkylene and heterocycloalkylene-$C_1$-$C_4$-alkylene-heterocycloalkylene.
This urea compound is used for improving the optical properties of the polyamide polymer composition. The present invention also relates to shaped articles obtained from said composition and to novel urea compounds.

21 Claims, No Drawings

POLYAMIDE COMPOSITIONS WITH IMPROVED OPTICAL PROPERTIES

CROSS-REFERENCE TO RELATED APPLICATIONS

This application claims benefit (under 35 USC 119(e)) of U.S. Provisional Application 61/612,996, filed Mar. 20, 2012, which is incorporated by reference.

The present invention relates to a polymer composition comprising at least one polyamide and at least one urea compound. This urea compound is used for improving the optical properties of the polyamide polymer composition. The present invention also relates to shaped articles obtained from said composition and to novel urea compounds.

DESCRIPTION

Polyamide (PA) is widely used in many different applications due to its very good performance properties and low cost, e.g. in automotive, mechanical engineering, electrical, electronics, sport and leisure industries. Polyamide is also used for food packaging. Many applications for polyamide used as plates, sheets, films and container require substantial clarity and/or substantially no haze to facilitate identification of articles, stored, wrapped, and/or covered therewith. Thus, it would be desirable to use transparent polyamide. Many polyamides, however, are semicrystalline and thus optically opaque due to the scattering of incident light by the crystalline domains present in the polyamide. Nucleating agents and clarifiers are commonly used in industrial practice in combination with crystallizable thermoplastic polymers to improve optical properties, e.g. clarity, haze or laser transparency. A great variety of nucleating agents and clarifiers are known for polypropylene. Until know, clarifying agents reducing haze in polyamide compositions are unknown. Accordingly, there is a great need for clarifying agents which can be used in polyamide compositions.

WO 04/072168 describes polypropylene compositions comprising amide compounds as nucleating agent.

JP 5320501 describes polyamide resin compositions comprising a polyamide resin, barium stearate as release agent and a bisurea compound of the formula $(R^1-NHC(O)NH)_2x$, where X is a bivalent hydrocarbon group and $R^1$ is an aliphatic hydrocarbon group having 9 to 40 C atoms, to improve the release properties. The mouldings obtained are said to have outstanding mechanical strength; in particular they combine toughness along with high rigidity. No mention is made of improved clarity, reduced haze or improved laser transparency.

Bisurea compounds of the formula A

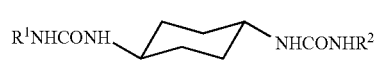

(A)

where $R^1$ and $R^2$ are $C_8$-$C_{20}$-alkyl, e.g. n-octyl, n-nonyl, n-octadecyl, 2-ethylhexyl or 1-ethylpentyl, are described in JP 2003064047. The cyclohexane derivative is used as organic gelling agent.

JP 2007051290 describes a transparent styrene resin composition comprising a transparent styrene resin and a bisurea compound of the formula $R^2-NHCONH-R^1-NHCONH-R^3$, in which $R^1$ is a bivalent hydrocarbon group and $R^2$ and $R^3$ are a hydrocarbon group having 9 to 40 carbon atoms. The transparent styrene resin composition provides molded products having excellent hue, curvature-property and chemical resistance.

The compounds trans-(4-ureidocyclohexyl)urea, 1,1'-(trans-1,4-cyclohexylene)bis(3-tert-butylurea) and 1,1'-(trans-1,4-cyclohexylene)bis(3-cyclohexylurea) are known from DE 2710595. The compound 1,1'-(trans-1,4-cyclohexylene)bis(3-phenylurea) is known from Journal für Praktische Chemie (1915), vol. 91, 1-38. The compound (R,R)-1-(1-phenylethyl)-3-{9-[3-(1-phenylethyl)ureido]nonyl}urea is known from Chem. Eur. J. 1997, 3, 1238-1243.

It is an object of the present invention to provide a polyamide composition having improved optical properties. They ought, in particular, to exhibit superior optical properties selected from increased clarity, reduced haze and increased laser transparency.

It has now been surprisingly found that urea compounds of the formula I as defined below are suitable as clarifying agents for polyamide compositions, in particular they improve at least one optical property selected form increased clarity, reduced haze and increased laser transparency in polyamide compositions.

The invention provides, accordingly, a composition which comprises at least one polyamide polymer and at least one compound of the formula I

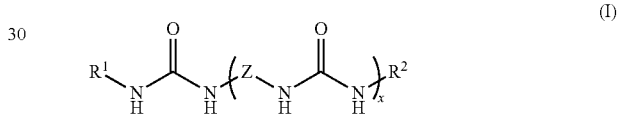

(I)

where
x is 1, 2 or 3;
$R^1$ and $R^2$ are, independently of each other, selected from hydrogen, linear $C_1$-$C_7$-alkyl, branched $C_3$-$C_{10}$-alkyl, unsubstituted or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl; and
Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cycloalkylene, unsubstituted or substituted $C_5$-$C_8$-cycloalkylene-$C_1$-$C_4$-alkylene-$C_5$-$C_8$-cycloalkylene, unsubstituted or substituted heterocycloalkylene and unsubstituted or substituted heterocycloalkylene-$C_1$-$C_4$-alkylene-heterocycloalkylene.

Another aspect of the present invention relates to the use of compounds of the formula I

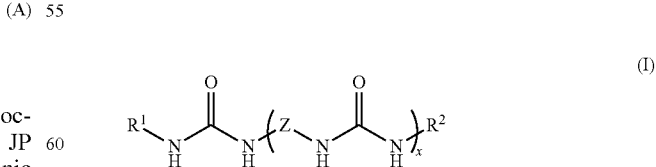

(I)

where $R^1$, $R^2$, Z and x are as defined above.
in a polymer composition which comprises at least one semicrystalline polyamide polymer for improving at least one optical property selected from increased clarity, increased laser transparency and reduced haze.

Another aspect of the present invention relates to a shaped article obtained from a composition as defined above.

Another aspect of the present invention relates to novel compounds of the formula I

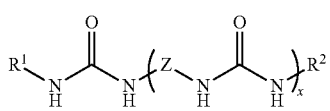

where
x is 1, 2 or 3;
R$^1$ and R$^2$ are, independently of each other, selected from hydrogen, linear C$_1$-C$_7$-alkyl, branched C$_3$-C$_{10}$-alkyl, unsubstituted or substituted C$_3$-C$_{12}$-cycloalkyl, unsubstituted or substituted C$_3$-C$_{12}$-cycloalkyl-C$_1$-C$_4$-alkyl, unsubstituted or substituted aryl and unsubstituted or substituted aryl-C$_1$-C$_4$-alkyl;
Z is selected from C$_3$-C$_{10}$-alkanediyl, unsubstituted or substituted arylene, unsubstituted or substituted arylene-C$_1$-C$_4$-alkylene-arylene, unsubstituted or substituted heteroarylene, unsubstituted or substituted heteroarylene-C$_1$-C$_4$-alkylene-heteroarylene, unsubstituted or substituted C$_5$-C$_8$-cycloalkylene, unsubstituted or substituted C$_5$-C$_8$-cycloalkylene-C$_1$-C$_4$-alkylene-C$_5$-C$_8$-cycloalkylene, unsubstituted or substituted heterocycloalkylene and unsubstituted or substituted heterocycloalkylene-C$_1$-C$_4$-alkylene-heterocycloalkylene
except for compounds, where
if R$^1$ and R$^2$ are identical and are hydrogen, tert-butyl, 2-ethylhexyl, 1-ethylpentyl, cyclohexyl or phenyl, and x is 1, Z is 1,4-cyclohexylene or
if R$^1$ and R$^2$ are both (R)-1-phenylethyl, and x is 1, Z is —(CH$_2$)$_9$—.

The inventive use of the urea compound of the formula I in the polymer composition comprising at least one polyamide polymer is accompanied by at least one of the following advantages:
the haze-value is reduced by at least 5%, compared to a reference polymer composition without a compound of the formula I, measured with the method according to ASTM D1003 (layer thickness 1.1 mm);
the clarity-value is increased by at least 5% compared to a reference polymer composition without a compound of the formula I, measured with the method according to ASTM D1003 (layer thickness 1.1 mm);
the laser transparency value is increased by at least 1% compared to a reference polymer composition without a compound of the formula I, measured at 1064 nm (layer thickness), As used herein, the term "haze" is defined as that percentage transmitted light which in passing through a specimen (plate) deviates from the incident light by more than 2.5° on the average. The haze is determined according to ASTM D 1003. As used herein, the term "clarity" is defined as that percentage transmitted light which in passing through a specimen (plate) deviates from the incident light by less than 2.5° on the average. The specimen should have substantially plane-parallel surfaces free of dust, grease, scratches and blemishes, and shall be free of distinct internal voids and particles.

Laser transmission welding is a method providing an alternative to vibration welding and heated-tool welding, and has seen a constant increase in its use in recent times, in particular with use of diode lasers.

The technical literature describes the fundamental principles of laser transmission welding (Kunststoffe 87, (1997) 3, 348-350; Kunststoffe 88, (1998), 2, 210-212; Kunststoffe 87 (1997) 11, 1632-1640; Plastverarbeiter 50 (1999) 4, 18-19; Plastverarbeiter 46 (1995) 9, 42-46).

Precondition for the use for laser transmission welding is that the radiation emitted from the laser first passes through a molding which has adequate transparency for laser light of the wavelength used, and which in this patent application is hereinafter termed laser-transparent molding, and is then absorbed, in a thin layer, by a second molding which is in contact with the laser-transparent molding and which hereinafter is termed laser-absorbent molding. Within the thin layer that absorbs the laser light, the energy of the laser is converted into heat, which leads to melting within the contact zone and finally to bonding of the laser-transparent and of the laser-absorbent molding via a weld.

Laser transmission welding usually uses lasers in the wavelength range from 600 to 1200 nm. In the wavelength range of the lasers used for thermoplastics welding, it is usual to use Nd:YAG laser (1064 nm) or high-power diode lasers (from 800 to 1000 nm). When the terms laser-transparent and laser-absorbent are used hereinafter, they always refer to the above-mentioned wavelength range.

A requirement for the laser-transparent molding, in contrast to the laser-absorbent molding, is high laser transparency in the preferred wavelength range, so that the laser beam can penetrate as far as the weld area, with the necessary energy.

As used herein, the term "semicrystalline" describes a polyamide polymer that exhibits X-ray patterns that have sharp features characteristic of crystalline regions and diffuse features characteristic of amorphous regions.

For the purposes of the present invention collective terms are used for the definitions of the variables that are indicated in the formulae, with these collective terms standing generally and representatively for the substituents in question. The definition C$_n$-C$_m$ indicates the possible number of respective carbon atoms in the respective substituent or substituent moiety.

The term "C$_1$-C$_4$-alkyl" as used herein denotes a straight-chain or branched alkyl group having from 1 to 4 carbon atoms. Examples are methyl, ethyl, n-propyl, iso-propyl, n-butyl, 2-butyl, iso-butyl and tert-butyl.

The term "linear C$_1$-C$_7$-alkyl" as used herein denotes a straight-chain alkyl group having from 1 to 7 carbon atoms. Examples are methyl, ethyl, n-propyl, n-butyl, n-pentyl, n-hexyl and n-heptyl.

The term "branched C$_3$-C$_{10}$-alkyl" as used herein denotes a branched alkyl group having form 3 to 10 carbon atom. Examples are iso-propyl, 2-butyl, iso-butyl, tert-butyl, 1-methylbutyl, 2-methylbutyl, 3-methylbutyl, 2,2-dimethylpropyl, 1-ethylpropyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, 1-methylhexyl, 2-methylhexyl, 3-methylhexyl, 4-methylhexyl, 5-methylhexyl, 1-ethylpentyl, 2-ethylpentyl, 3-ethylpentyl, 1-methylheptyl, 2-methylheptyl, 3-methylheptyl, 4-methylheptyl, 5-methylheptyl, 1-propylpentyl, 1-ethylhexyl, 2-ethylhexyl, 3-ethylhexyl, 1-methyloctyl, 2-methylheptyl, 1-ethylhexyl, 2-ethylhexyl, 1,2-dimethylhexyl, 1-propylpentyl, 2-propylpentyl and the like.

The term "$C_1$-$C_{10}$-alkyl" as used herein denotes a straight-chain or branched alkyl group having from 1 to 10 carbon atoms. Examples for $C_1$-$C_{10}$-alkyl are, apart those mentioned for $C_1$-$C_4$-alkyl and branched $C_3$-$C_{10}$-alkyl, n-pentyl, n-hexyl, n-heptyl, n-octyl, n-nonyl and n-decyl.

The term $C_3$-$C_{10}$-alkanediyl (also referred to as $C_3$-$C_{10}$-alkylene) as used herein refers to a straight-chain or branched saturated alkyl group having 3 to 10 carbon atoms, where one of the hydrogen atoms in these groups is replaced by a further bonding position. Examples for linear $C_3$-$C_6$-alkanediyl comprise, propane-1,3-diyl, butane-1,4-diyl, pentane-1,5-diyl, hexane-1,6-diyl. Examples for branched $C_{13}$-$C_6$-alkanediyl comprise propyl-1,1-diyl, butyl-1,1-diyl, 1-methylethane-1,2-diyl, 1,2-dimethylethane-1,2-diyl, 1-ethylethane-1,2-diyl, 1-methylpropane-1,3-diyl, 2-methylpropan-1,3-diyl and the like.

The term "$C_3$-$C_{12}$-cycloalkyl" as used herein refers to a mono- or bi- or tricyclic hydrocarbon radical having 3 to 12 (=$C_3$-$C_{12}$-cycloalkyl), frequently 5 to 10 carbon atoms (=$C_5$-$C_{10}$-cycloalkyl). Examples of monocyclic radicals having 3 to 10 carbon atoms comprise cyclopropyl, cyclobutyl, cyclopentyl, cyclohexyl, cycloheptyl, cyclooctyl, cyclononyl and cyclodecyl. Examples of bicyclic radicals having 7 to 8 carbon atoms comprise bicyclo[2.2.1]hexyl, bicyclo[2.2.1]heptyl, bicyclo[3.1.1]heptyl, bicyclo[2.2.2]octyl and bicyclo[3.2.1]octyl. Examples of tricyclic radicals comprise 1-adamantyl, 2-adamamantyl and homoadamantyl. $C_3$-$C_{12}$-cycloalkyl can be unsubstituted or substituted by one or more, e.g., 1, 2 or 3, identical or different radicals $R^a$, where $R^a$ is selected from $C_1$-$C_{10}$-alkyl or halogen.

The term "$C_5$-$C_8$-cycloalkylene" (also referred to as $C_5$-$C_8$-cycloalkanediyl) as used herein in each case denotes a cycloalkyl radical as defined above, wherein one hydrogen atom at any position of the cycloalkyl ring is replaced by one further binding site, thus forming a bivalent moiety. $C_5$-$C_8$-cycloalkylene can be unsubstituted or substituted by one or more, e.g., 1, 2 or 3, identical or different radicals $R^b$, where $R^b$ is selected from $C_1$-$C_{10}$-alkyl or halogen.

The term "$C_n$-$C_m$-cycloalkyl-$C_o$-$C_p$-alkyl" or as used herein refers to a cycloalkyl group, as defined above, having n to m carbon atoms, which is bound to the remainder of the molecule via an alkylene group, as defined above, having o to p carbon atoms. Examples are cyclopentylmethyl, cyclopentylethyl, cyclopentylpropyl, cyclohexylmethyl, cyclohexylethyl, cyclohexylpropyl, and the like. In case that $C_n$-$C_m$-cycloalkyl-$C_o$-$C_p$-alkyl is substituted, the cycloalkyl moiety carries one or more, e.g., 1, 2 or 3, identical or different radicals $R^a$, where $R^a$ is selected from $C_1$-$C_{10}$-alkyl or halogen.

The term "aryl" as used herein refers to a $C_6$-$C_{14}$ carboaromatic group, such as phenyl, naphthyl, anthracenyl and phenanthrenyl. Aryl can be unsubstituted or substituted by one or more, e.g., 1, 2 or 3, identical or different radicals $R^a$, where $R^a$ is selected from $C_1$-$C_{10}$-alkyl or halogen. Preferably, aryl is phenyl.

The term "arylene" as used herein refers to an aryl radical as defined above, wherein one hydrogen atom at any position of aryl is replaced by one further binding site, thus forming a bivalent moiety. Arylene can be unsubstituted or substituted by one or more, e.g., 1, 2 or 3, identical or different radicals $R^b$, where $R^b$ is selected from $C_1$-$C_{10}$-alkyl or halogen. Preferably, aryl is phenylene.

The term "phenylene" refers to 1,2-phenylene (o-phenylene), 1,3-phenylene (m-phenylene) and 1,4-phenylene (p-phenylene).

The term "heteroaryl" ("mono or bicyclic 5- to 10-membered heteroaromatic ring") as used herein refers to a monocyclic heteroaromatic radical which has 5 or 6 ring members, which may be fused to a carbocyclic or heterocyclic 5-, 6- or 7-membered ring thus having a total number of ring members from 8 to 10, wherein in each case 1, 2, 3 or 4, preferably 1, 2 or 3, of these ring members are heteroatoms selected, independently from each other, from the group consisting of oxygen, nitrogen and sulfur. The heteroaryl radical may be attached to the remainder of the molecule via a carbon ring member or via a nitrogen ring member. The carbocyclic or heterocyclic fused ring is selected from $C_5$-$C_7$-cycloalkyl, 5-, 6- or 7-membered heterocyclyl and phenyl. Heteroaryl can be unsubstituted or substituted by one or more, e.g., 1, 2 or 3, identical or different radicals $R^a$, where $R^a$ is selected from $C_1$-$C_{10}$-alkyl or halogen. Preferably, aryl is phenyl.

Examples for monocyclic 5- to 6-membered heteroaromatic rings include triazinyl, pyrazinyl, pyrimidyl, pyridazinyl, pyridyl, thienyl, furyl, pyrrolyl, pyrazolyl, imidazolyl, triazolyl, tetrazolyl, thiazolyl, oxazolyl, thiadiazolyl, oxadiazolyl, isothiazolyl and isoxazolyl.

Examples for 5- to 6-membered heteroaromatic rings being fused to a phenyl ring (or for a phenyl ring fused to a 5- to 6-membered heteroaromatic ring) are quinolinyl, isoquinolinyl, indolyl, indolizinyl, isoindolyl, indazolyl, benzofuryl, benzthienyl, benzo[b]thiazolyl, benzoxazolyl, benzthiazolyl, benzoxazolyl, and benzimidazolyl. Examples for 5- to 6-membered heteroaromatic rings being fused to a cycloalkenyl ring are dihydroindolyl, dihydroindolizinyl, dihydroisoindolyl, dihydrochinolinyl, dihydroisochinolinyl, chromenyl, chromanyl and the like.

The term "heteroarylene" as used herein refers to a heteroaryl radical as defined above, wherein one hydrogen atom at any position of heteroaryl is replaced by one further binding site, thus forming a bivalent moiety. Heteroarylene can be unsubstituted or substituted by one or more, e.g., 1, 2 or 3, identical or different radicals $R^b$, where $R^b$ is selected from $C_1$-$C_{10}$-alkyl or halogen.

The term "heterocyclyl" comprises nonaromatic saturated or partially unsaturated heterocyclic rings having 5 or 6 ring members and 1, 2, 3 or 4, preferably 1, 2 or 3 heteroatoms as ring members. The heterocyclic radical may be attached to the remainder of the molecule via a carbon ring member or via a nitrogen ring member. Examples for non-aromatic rings include pyrrolidinyl, pyrazolinyl, imidazolinyl, pyrrolinyl, pyrazolinyl, imidazolinyl, tetrahydrofuranyl, dihydrofuranyl, 1,3-dioxolanyl, dioxolenyl, thiolanyl, dihydrothienyl, oxazolidinyl, isoxazolidinyl, oxazolinyl, isoxazolinyl, thiazolinyl, isothiazolinyl, thiazolidinyl, isothiazolidinyl, oxathiolanyl, piperidinyl, piperazinyl, pyranyl, dihydropyranyl, tetrahydropyranyl, 1,3- and 1,4-dioxanyl, thiopyranyl, dihydrothiopyranyl, tetrahydrothiopyranyl, morpholinyl, thiazinyl and the like. Examples for heterocyclic ring also comprising 1 or 2 carbonyl groups as ring members comprise pyrrolidin-2-onyl, pyrrolidin-2,5-dionyl, imidazolidin-2-onyl, oxazolidin-2-onyl, thiazolidin-2-onyl and the like. Heterocyclyl can be unsubstituted or substituted by one or more, e.g., 1, 2 or 3, identical or different radicals $R^a$, where $R^a$ is selected from $C_1$-$C_{10}$-alkyl or halogen. Preferably, aryl is phenyl.

The term "halogen" denotes fluorine, chlorine, bromine or iodine.

Depending on the substitution pattern, the compounds of the formula I of the present invention or used according to the present invention may have one or more centers of chirality, in which case they are present as mixtures of enantiomers or diastereomers. The invention provides both the pure enantiomers or pure diastereomers of the formula I and their mixtures and the use according to the invention of the pure enantiomers or diastereomers of the compounds I or their mixtures.

Polyamide polymers are herein to be understood as being homopolymers, copolymers, blends and grafts of synthetic long-chain polyamides having recurring amide groups in the polymer main chain as an essential constituent.

Examples of polyamide homopolymers are nylon-6 (PA 6, polycaprolactam), nylon-7 (PA 7, polyenantholactam or polyheptanoamide), nylon-10 (PA 10, polydecanoamide), nylon-11 (PA 11, polyundecanolactam), nylon-12 (PA 12, polydodecanolactam), nylon-4,6 (PA 46, polytetramethyleneadipamide), nylon-6,6 (PA 66, polyhexamethyleneadipamide), nylon-6,9 (PA 69, polycondensation product of 1,6-hexamethylenediamine and azelaic acid), nylon-6,10 (PA 610, polycondensation product of 1,6-hexamethylene diamine and 1,10-decanedioic acid), nylon-6,12 (PA 612, polycondensation product of 1,6-hexamethylenediamine and 1,12-dodecanedioic acid), nylon 10,10 (PA 1010, polycondensation product of 1,10-decamethylenediamine and 1,10-decanedicarboxylic acid), PA 1012 (polycondensation product of 1,10-decamethylenediamine and dodecanedicarboxylic acid) or PA 1212 (polycondensation product of 1,12-dodecamethylenediamine and dodecanedicarboxylic acid).

Polyamide copolymers may comprise the polyamide building blocks in various ratios. Examples of polyamide copolymers are nylon 6/66 and nylon 66/6 (PA 6/66, PA 66/6, copolyamides made from PA 6 and PA 66 building blocks, i.e. made from caprolactam, hexamethylenediamine and adipic acid). PA 66/6 (90/10) may contain 90% of PA 66 and 10% of PA 6. Further examples are nylon 66/610 (PA 66/610, made from hexamethylenediamine, adipic acid and sebacic acid).

Polyamides further include partially aromatic polyamides. The partially aromatic polyamides are usually derived from aromatic dicarboxylic acids such as terephthalic acid or isophthalic acid and a linear or branched aliphatic diamine. Examples are PA 9T (formed from terephthalic acid and nonanediamine), PA 6T/6I (formed from hexamethylenediamine, terephthalic acid and isophthalic acid), PA 6T/6, PA 6T/6I/66 and PA 6T/66.

Polyamides further include aromatic polyamides such as poly-meta-phenylene-isophathalamides (Nomex®) or poly-para-phenylene-terephthalamide (Kevlar®).

Polyamides can in principle be prepared by two methods. In a polymerization from dicarboxylic acids and diamines and also in a polymerization from amino acids or their derivatives, such as aminocarbonitriles, aminocarboxamides, aminocarboxylate esters or aminocarboxylate salts, the amino and carboxyl end groups of the starting monomers or starting oligomers react with one another to form an amide group and water. The water can subsequently be removed from the polymer. In a polymerization from carboxamides, the amino and amide end groups of the starting monomers or starting oligomers react with one another to form an amide group and ammonia. The ammonia can subsequently be removed from the polymer. This polymerization reaction is customarily known as a polycondensation.

A polymerization from lactams as starting monomers or starting oligomers is customarily known as a polyaddition.

Polyamides further include copolymers made of polyamides and of a further segment, for example taking the form of a diol, polyester, ether, etc., in particular in the form of polyesteramides, polyetheresteramides or polyetheramides. For example, in polyetheramides, the polyamide segment can be any commercial available polyamide, preferably PA 6 or PA 66 and the polyether is usually polyethylene glycol, polypropylene glycol or polytetramethylene glycol.

A preferred embodiment of the invention relates to compositions, shaped articles and uses, where the polyamide is selected from aliphatic polyamides, partially aromatic polyamides and mixtures thereof. According to a particular aspect of this embodiment, the polyamide polymer is selected from PA 6, PA 7, PA 10, PA 11, PA 12, PA 66, PA 69, PA 610, PA 612, PA 1010, PA 6/66, PA 66/6, PA 66/610 and mixtures thereof. According to a more particular aspect of this embodiment, the polyamide is selected from PA 6, PA 11, PA 12, PA 66, PA 66/6, PA 6/66 and mixtures thereof.

The remarks made below as to preferred embodiments of the variables (substituents) and indices of the compounds of formula I are valid on their own as well as preferably in combination with each other. It is clear to a skilled person that for x being 2 or 3, Z may be identical or different.

The remarks made below concerning preferred embodiments of the variables (substituents) and indices further are valid concerning the compounds of formula I as well as concerning the compositions and shaped articles according to the invention and the uses according to the present invention.

A preferred embodiment of the invention relates to compositions, compounds, shaped articles and uses, where in the compound of formula I the variables $R^1$, $R^2$, Z and x each alone or in combination have the following meanings:

x is 1, 2 or 3;

$R^1$ and $R^2$ are, independently of each other, selected from linear $C_1$-$C_7$-alkyl, branched $C_3$-$C_{10}$-alkyl, unsubstituted or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl; and Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cycloalkylene, unsubstituted or substituted $C_5$-$C_8$-cycloalkylene-$C_1$-$C_4$-alkylene-$C_5$-$C_8$-cycloalkylene, unsubstituted or substituted heterocycloalkylene and unsubstituted or substituted heterocycloalkylene-$C_1$-$C_4$-alkylene-heterocycloalkylene.

A preferred embodiment of the invention relates to compositions, compounds, shaped articles and uses, where in the compound of formula I the variables $R^1$, $R^2$, Z and x each alone or in combination have the following meanings:

x is 1, 2 or 3, preferably 1 or 2, in particular 1;

$R^1$ and $R^2$ are, independently of each other, selected from hydrogen, branched $C_3$-$C_{10}$-alkyl, $C_5$-$C_{12}$-cycloalkyl, $C_5$-$C_{12}$-cycloalkyl, $C_5$-$C_{12}$-cycloalkyl-$C_1$-$C_4$-alkyl, aryl and aryl-$C_1$-$C_4$-alkyl, where each ring in the four last-mentioned radicals is unsubstituted or substituted by one or more identical or different radicals $R^a$, where $R^a$ is selected from $C_1$-$C_{10}$-alkyl and halogen.

More preferably, $R^1$ and $R^2$ are, independently of each other, selected from hydrogen, branched $C_3$-$C_{10}$-alkyl, $C_5$-$C_{12}$-cycloalkyl, $C_5$-$C_{12}$-cycloalkyl, $C_5$-$C_{12}$-cycloalkyl-$C_1$-$C_4$-alkyl, phenyl and phenyl-$C_1$-$C_4$-alkyl, where each ring in the four last-mentioned radicals is unsubstituted or substituted by one or more identical or different radicals $R^a$, where $R^a$ is selected from $C_1$-$C_{10}$-alkyl and halogen.

In particular, $R^1$ and $R^2$ are, independently of each other, selected from hydrogen, branched $C_3$-$C_{10}$-alkyl, which is attached to the skeleton via a secondary or tertiary carbon atom of the alkyl group, $C_5$-$C_{10}$-cycloalkyl which is unsubstituted or substituted by 1 or 2 radicals R$^a$, and phenyl which is unsubstituted or substituted by 1 or 2 radicals R$^a$.

Suitable examples for R$^1$ and R$^2$ are hydrogen, ethyl, n-propyl, isopropyl, n-butyl, tert-butyl, 1-methylpropyl, 1-ethylpropyl, 1,1-dimethylpropyl, 2-methylbutyl, 1,5-dimethylhexyl, 1,1,3,3-tetramethylbutyl, 1-adamantyl, 2-adamamantyl, homoadamantyl, cyclopentyl, cyclohexyl, cyclopentylmethyl, 1-cyclopentylethyl, 2-cyclopentylethyl, cyclohexylmethyl, 1-cyclohexylethyl, 2-cyclohexylethyl, cyclopentyl which is substituted by 1 or 2 C$_1$-C$_4$-alkyl, cyclohexyl which is substituted by 1 or 2 C$_1$-C$_4$-alkyl, phenyl, tolyl or 3,4-dimethylphenyl. In particular, R$^1$ and R$^2$ are selected from hydrogen, isopropyl, tert-butyl, 1-methylpropyl, 1-ethylpropyl, 1,1-dimethylpropyl, 2-methylbutyl, 1,5-dimethylhexyl, 1,1,3,3-tetramethylbutyl and 1-adamantyl.

Z is C$_5$-C$_8$-alkanediyl, C$_5$-C$_7$-cycloalkylene, C$_5$-C$_7$-cycloalkylene-CH$_2$—C$_5$-C$_7$-cycloalkylene, phenylene or phenylen-CH$_2$-phenylene, where each ring in the four last-mentioned radicals is unsubstituted or substituted by one or two identical or different radicals R$^b$, where R$^b$ is C$_1$-C$_{10}$-alkyl or halogen Z is preferably 1,5-pentanediyl, 1,6-hexanediyl, 1,7-heptanediyl, cis 1,2-cyclopentanediyl, trans 1,2-cyclopentanediyl, cis 1,3-cyclopentanediyl, trans 1,3-cyclopentanediyl, where the 4 last mentioned radicals are unsubstituted or carry 1 or 2 C$_1$-C$_4$-alkyl groups, cis 1,2-cyclohexanediyl, trans 1,2-cyclohexanediyl, cis 1,3-cyclohexanediyl, trans 1,3-cyclohexanediyl, cis 1,4-cyclohexanediyl, trans 1,4-cyclohexandeiyl, where the 6 last-mentioned groups are unsubstituted or carry 1 or 2 C$_1$-C$_4$-alkyl groups, 1,2-phenylene, 1,3-phenylene, 1,4-phenylene, where the 3 last-mentioned groups are unsubstituted or carry 1 or 2 C$_1$-C$_4$-alkyl groups;

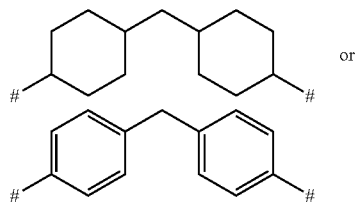

or where # is the point of attachment to the internal nitrogen atom in the urea moiety;

In particular, Z is trans-1,4-cyclohexanediyl. In particular, if x is 2, each Z has the same meaning.

A preferred embodiment of the invention relates to compositions, compounds, shaped articles and uses, where in the compound of formula I R$^1$ and R$^2$ have different meanings. A further preferred embodiment of the invention relates to compositions, compounds, shaped articles and uses, where in the compound of formula I, R$^1$ and R$^2$ have the same meaning.

A particularly preferred embodiment of the invention relates to compositions, compounds, shaped articles and uses, where in the compound of formula I the variables R$^1$, R$^2$, Z and x have the following meanings:

R$^1$ and R$^2$ have the same meaning and are selected from 1,1-dimethylpropyl, 1,5-dimethylhexyl, 1,1,3,3-tetramethylbutyl and 1-adamantyl;

Z is trans 1,4-cyclohexanediyl; and x is 1.

A further particularly preferred embodiment of the invention relates to compositions, compounds, shaped articles and uses, where in the compound of formula I the variables R$^1$ and R$^2$ are both hydrogen, Z is trans 1,4-cyclohexanediyl and x is 1.

A particularly preferred embodiment of the invention relates to compositions, shaped articles and uses, where the polyamide polymer is selected from PA 6, PA 11, PA 12, PA 66, PA 610, PA 66/6 and PA 6/66 and in the compound of formula I R$^1$ and R$^2$ are identical and selected from tert-butyl, 1,1-dimethylpropyl, 1,5-dimethylhexyl, 1,1,3,3-tetramethylbutyl and 1-adamantyl; Z is trans 1,4-cyclohexylene (trans 1,4-cyclohexanediyl); and x is 1.

A particularly preferred embodiment of the invention relates to compositions, shaped articles and uses, where the polyamide polymer is selected from PA 6, PA 11, PA 12, PA 66, PA 610, PA 66/6 and PA 6/66 and in the compound of formula I R$^1$ and R$^2$ are both hydrogen; Z is trans 1,4-cyclohexylene (trans 1,4-cyclohexanediyl); and x is 1.

The compounds of the formula I are either known in the art or can be prepared in analogy to standard methods in the art or as outlined in the experimental part of this application.

Compounds of the formula I, where x is 1, are also referred to as bisurea compounds I. Compounds of the formula I, where x is 2, are also referred to as trisurea compounds I. Compounds of the formula I, where x is 3, are also referred to as tetra-urea compounds I.

For example, compounds of the formula I, where x is 1 and R$^1$ and R$^2$ have the same meaning can be prepared as outlined in schemes 1 and 2 below.

Scheme 1:

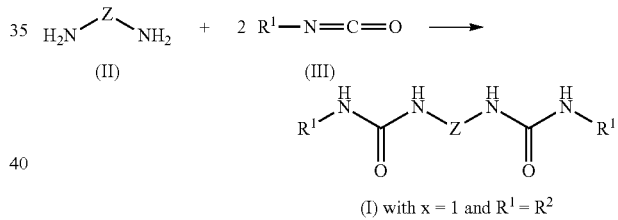

In Scheme 1, Z and R$^1$ are as defined. A diamine compound of the formula II is reacted with two equivalents of isocyanate III to yield the compound of the formula I in good yields. The reaction is usually carried out in an organic solvent. Suitable solvents are polar aprotic solvents such as tetrahydrofuran.

Alternatively, the bisurea compounds of the formula I can be prepared by reacting a diisocyanate compound of the formula IV with an amine of the formula V. The reaction is usually carried out in an organic solvent. Suitable solvents are polar aprotic solvents such as tetrahydrofuran.

Scheme 2:

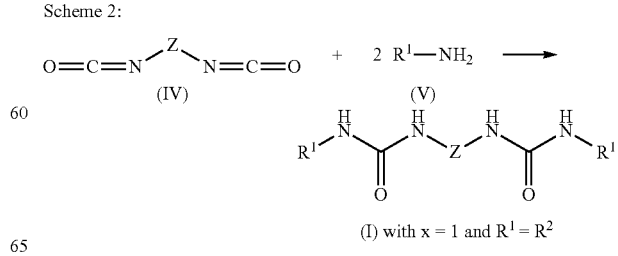

In Scheme 2, Z and R$^1$ are as defined above.

Compounds of the formula I, where x is 1 and $R^1$ and $R^2$ have different meaning can be prepared as outlined in scheme 3 below.

Scheme 3:

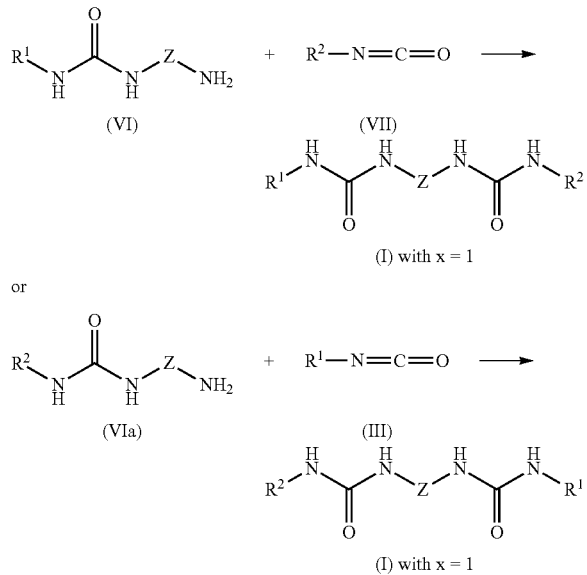

In Scheme 3, Z, $R^1$ and $R^2$ are as defined above. Treatment of an amine compound of the formula VI and VIa, respectively, with an isocyanate VII and III, respectively, yields the compound of the formula I in good yields. The reaction is usually carried out in an organic solvent. Suitable solvents are polar aprotic solvents such as N-methylpyrrolidon.

Trisurea-compounds of the formula I, i.e. compounds of the formula I, where x is 2 and $R^1$ has the same meaning as $R^2$, can be prepared as outlined in scheme 4.

Scheme 4:

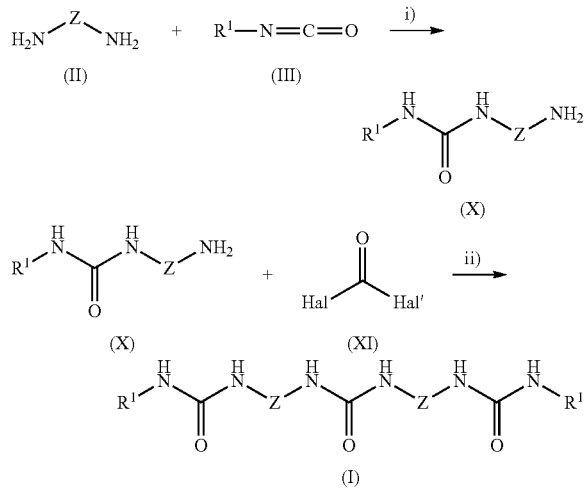

In Scheme 4, Z and $R^1$ are as defined above. Hal is halogen, Hal' is halogen. Preferably, Hal and Hal' are chlorine.

In step i) of scheme 4, the diamine II is reacted with one equivalent of isocyanate III to give an amine compound X. The reaction can be carried out in analogy to the procedure described in scheme 1. In step ii) of scheme 4, the amine compound X is reacted with a carbonyl dihalide of the formula XI to give the trisurea compound I.

Trisurea-compounds of the formula I, i.e. compounds of the formula I, where x is 2, and $R^1$ has the same meaning as $R^2$, can also be prepared as outlined in scheme 5.

Scheme 5:

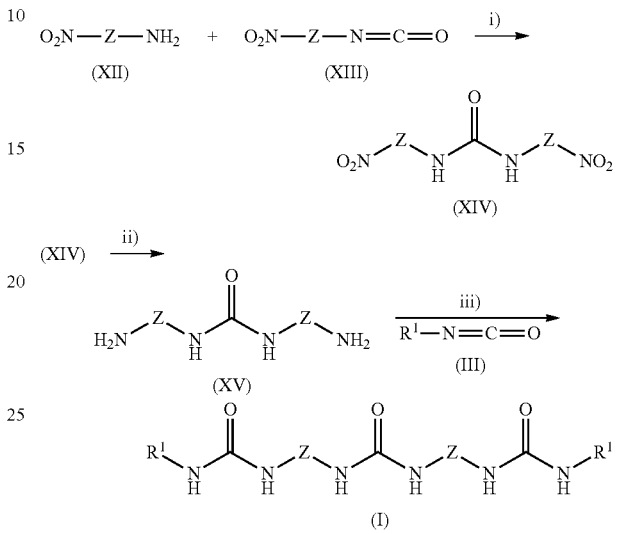

In Scheme 5, $R^1$ is as defined above and Z is as defined above, preferably cycloalkylene or arylene.

In step i) of scheme 5, the amine compound XII is reacted with the isocyanate compound XIII to give the dinitro compound XIV. The reaction can be carried out in analogy to the method described in step i) of scheme 4. In step ii) of scheme 5, the dinitro compound XIV is reduced to the diamino compound XV. The reduction can be carried out with hydrazine hydrate in the presence of a Pd/C catalyst. In step iii) of scheme 5, the reaction between the diamino compound XV and 2 equivalents of the isocyanate compound III yields the trisurea compound I.

Tetra-urea-compounds of the formula I, i.e. compounds of the formula I, where x is 3, and $R^1$ has the same meaning as $R^2$, can be prepared as outlined in scheme 6.

Scheme 6:

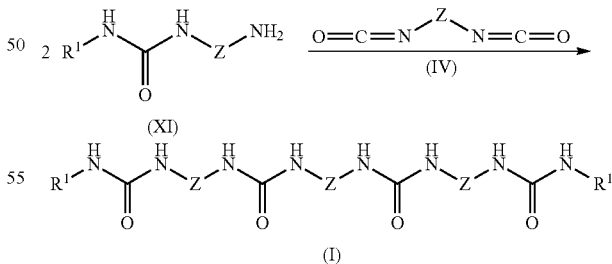

In Scheme 6, $R^1$ and Z are as defined above. $R^1$ may have identical or different meanings. Z may have identical or different meanings. The amino compound XI is reacted with a diisocyanate compound IV in analogy to the procedure described in scheme 2.

The compositions according to the present invention have excellent optical properties selected from high clarity, low haze and high laser transparency.

Also part of the invention is a composition containing at least one polyamide polymer as defined above and a compound of the formula I as nucleating agent, in particular haze reducing agent characterized in that the compound of formula I is able to provide the composition with a haze value which is reduced by at least 5%, preferably 10%, more preferably 15% and in particular 20% compared to a reference polymer composition without an additive of the formula I. For example, a preferred composition according to the present invention is characterized in that the compound of formula I is able to provide the composition with a haze value which is reduced by at least 5%, preferably 10%, more preferably 15% and in particular 20% of the original haze value, in the concentration range of 0.001 to 3% by weight, relative to the weight of the polyamide polymer; the original haze value is the haze value obtained without using compound I and measured on plaques of 1.1 mm thickness.

A preferred composition of the present invention is characterized by a haze value which is smaller than 75%; the haze value being measured at a plate of 1.1 mm thickness. A composition which is characterized by a haze of 1 to 75%, in particular 2 to 60% is preferred.

The haze is determined according to ASTM D 1003.

Examples of haze are 1 to 75%, 2 to 65%, 2 to 60%, 2 to 55%, 2 to 50%, 2 to 45%, 2 to 40%, 2 to 35%, 2 to 30%, 2 to 25%, 2 to 20%, 2 to 15%, 2 to 10%, 5 to 65%, 5 to 60%, 5 to 55%, 5 to 50%, 5 to 45%, 5 to 40%, 5 to 35%, 5 to 30%, 5 to 25%, 5 to 20%, 5 to 15%, 5 to 10%, 7 to 65%, 7 to 60%, 7 to 55%, 7 to 50%, 7 to 45%, 7 to 40%, 7 to 35%, 7 to 30%, 7 to 25%, 7 to 20%, 7 to 15%, 7 to 10%, 10 to 65%, 10 to 60%, 10 to 55%, 10 to 50%, 10 to 45%, 10 to 40%, 10 to 35%, 10 to 30%, 10 to 25%, 10 to 20% and 10 to 15%, in particular 10 to 40% or 13 to 40%, in particular 10 to 50%.

Also part of the invention is a composition containing at least one polyamide polymer as defined above and a compound of the formula I as nucleating agent, in particular clarity increasing agent characterized in that the compound of formula I is able to provide the composition with a clarity value which is increased by at least 5%, preferably 10%, more preferably 15% and in particular 20% compared to a reference polymer composition without an additive of the formula I. For example, a preferred composition according to the present invention is characterized in that the compound of formula I is able to provide the composition with a clarity value which is increased by at least 5%, preferably 10%, more preferably 15% and in particular 20% of the original clarity value, in the concentration range of 0.001 to 3% by weight, relative to the weight of the polyamide polymer; the original clarity value is the clarity value obtained without using compound I and measured on plaques of 1.1 mm thickness.

In the above embodiment, the composition is preferably characterized by a clarity value of 60 to 100%, more preferably 70 to 100%, especially 80 to 100%, in particular 85 to 99.9%, the clarity value being measured on plaques of 1.1 mm thickness and measured with the method according to ASTM D1003.

Examples of clarity values are 60 to 100%, 65 to 100%, 70 to 100%, 75 to 100%, 80 to 100%, 85 to 100%, 90 to 100%, 60 to 99.9%, 65 to 99.9%, 70 to 99.9%, 75 to 99.9%, 80 to 99.9%, 85 to 99.9%, in particular 70 to 100% or 80 to 99.9%.

Also part of the invention is a composition containing at least one polyamide polymer as defined above and a compound of the formula I as nucleating agent, in particular laser transparency increasing agent characterized in that the compound of formula I is able to provide the composition with a laser transparency value which is increased by at least 1%, preferably 3%, more preferably 5% and in particular 10% compared to a reference polymer composition without an additive of the formula I. For example, a preferred composition according to the present invention is characterized in that the compound of formula I is able to provide the composition with a laser transparency value which is increased by at least 1%, preferably 3%, more preferably 5% and in particular 10% of the original laser transparency value, in the concentration range of 0.001 to 3% by weight, relative to the weight of the polyamide polymer; the original laser transparency value is the laser transparency value obtained without using compound I and measured on plaques of 1.1 mm thickness, measured at 1064 nm.

In the above embodiment, the composition is preferably characterized by a laser transparency value of 50 to 100%, more preferably 55 to 100%, especially 60 to 99%, in particular 70 to 99%, the laser transparency value being measured on plaques of 1.1 mm thickness, measured at 1064 nm.

Examples of laser transparency values are 50 to 100%, 55 to 100%, 60 to 100%, 65 to 100%, 70 to 100%, 75 to 100%, 80 to 100%, 85 to 100%, 90 to 100%, 50 to 99.9%, 55 to 99.9%, 60 to 99.9%, 65 to 99.9%, 70 to 99.9%, 75 to 99.9%, 80 to 99.9%, 85 to 99.9%, in particular 50 to 99.9% or 60 to 99.9%.

The compositions of the invention often contain one or more further components, e.g. selected from colorants, antioxidants, UV-absorber, light stabilizers, reinforcing materials, fillers, antifogging agents, mold release agents, biocides, antistatic agents and rheology modifiers. These components usually do not effectively block transparency of the articles made from the inventive composition. For sufficient transparency, the compositions do not contain components in an amount that would significantly impair transparency of the article made from the inventive composition. Examples for additional components which may be contained in the composition of the invention include the following:

1. Colorants

The term colorant comprises dyes and pigments. The pigment may be an organic or inorganic pigment as known in the art. Examples for suitable pigments are color pigments, pearlescent pigments, e.g. effect pigments or pigments based on liquid crystal polymers.

The colorant can be a dye. Likewise regarded as colorants are organic compounds which exhibit fluorescence in the visible part of the electromagnetic spectrum, such as fluorescent dyes or fluorescent whitening agents. The colorant may also have further properties such as electrical conductivity, or may be magnetically shielding.

Suitable dyes are all dyes which are soluble in the polyamide polymer composition. Examples of suitable dyes are azo dyes, pyrazolone dyes, anthraquinone dyes, perinone dyes, perylene dyes, indigo and thioindigo dyes, and azomethine dyes.

2. Antioxidants 2.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

2.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

2.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.

2.4. Tocopherols, for example α-tocopherol, (β-tocopherol, γ-tocopherol, δ-tocopherol and mixtures thereof (vitamin E).

2.5. Hydroxylated thiodiphenyl ethers, for example 2,2'-thiobis(6-tert-butyl-4-methylphenol), 2,2'-thiobis(4-octylphenol), 4,4'-thiobis-(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

2.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycolbis[3,3-bis(3'-tertbutyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

2.7. O-, N- and S-benzyl compounds, for example 3,5,3', 5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

2.8. Hydroxybenzylated malonates, for example dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

2.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

2.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

2.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

2.12. Acylaminophenols, for example 4-hydroxylauranilide, 4-hydroxystearanilide, octyl N-(3,5-di-tert-butyl-4-hydroxyphenyl)carbamate.

2.13. Esters of β-(3,5-di-tert-butyl-4-hydroxyphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

2.14. Esters of β-(5-tert-butyl-4-hydroxy-3-methylphenyl) propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

2.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

2.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

2.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard™ XL-1, supplied by Uniroyal).

2.18. Ascorbic acid (vitamin C)

2.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl)-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

3. UV absorbers and light stabilisers 3.1. 2-(2'-Hydroxyphenyl)benzotriazoles, for example 2-(2'-hydroxy-5'-methylphenyl)benztriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyhbenzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2'-methyl-enebis[4-(1,1,3,3-tetramethylbutyl)-6-benzotriazole-2-ylphenol] the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, where R=3'-tert-butyl-4'-hydroxy-5'-2H-benzotriazol-2-yl-phenyl, 2-[2'-hydroxy-3'-(α,α-dimethylbenzyl)-5'-(1,1,3,3-tetramethylbutyl)phenyl] benzotriazole; 2-[2'-hydroxy-3'-(1,1,3,3-tetramethylbutyl)-5'-(α,α-dimethylbenzyl)phenyl]benzotriazole.

3.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and Z-hydroxy-4,4'-dimethoxy derivatives.

3.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

3.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

3.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

3.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-di-chloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2, 5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-di-aza-4-oxospiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

3.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

3.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

4. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

5. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

6. Phosphorus-containing acids, phosphorus-containing acid salt, phosphorus-containing acid ester or derivative thereof:

Phosphorus-containing acids include the oxo acids of phosphorous such as the phosphoric acid, phosphonic acid and phosphinic acid. Suitable salts of the phosphous-containing acids are alkali metal salts, earth alkali metal salts or transition metal salts. Among these, calcium, barium, magnesium, sodium, potassium, manganese and aluminum salts are preferred. In particular preferred are sodium phosphinate ($NaPO_2H_2$, also known as sodium hypophosphite), manganese bis(phosphinate) (($Mn(H_2PO_2)_2$ also known as manganese(II)-hypophosphite), aluminum phosphinate (Al ($H_2PO_2)_3$) and mixtures thereof. Also in particular preferred are phosphonic acid esters, half-esters and mixtures thereof, especially hydroxyphenylalkylphosphonic acid esters, half-esters or mixtures thereof, for example those disclosed in WO2007006647, especially calcium bis[monoethyl(3,5-di-tert-butyl-4-hydroxybenzyl)phosphonate] (Irgamod® 195, commercially available from BASF SE), or diethyl (3,5-di-tert-butyl-4-hydroxybenzyl)phosphonate (Irgamod® 295, commercially available from BASF SE).

7. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

8. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylthydroxylamine derived from hydrogenated tallow amine.

9. Thiosynergists, for example dilauryl thiodipropionate or distearyl thiodipropionate.

10. Peroxide scavengers, for example esters of P-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(p-dodecylmercapto)propionate.

11. Polyamide stabilisers, for example copper salts in combination with iodides and/or phosphorus compounds and salts of divalent manganese.

12. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitat, antimony pyrocatecholate or zinc pyrocatecholate.

13. Other additives, for example plasticisers, lubricants, flowcontrol agents, flameproofing agents, mold release agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

15. Fillers or reinforcing agents comprise, for example, glass fibers in the form of glass fabrics, glass mats or filament glass rovings, chopped glass, glass beads, and wollastonite. Glass fibers can be incorporated both in the form of short glass fibers and in the form of continuous fibers (rovings).

16. Antistatic agents, for example, amine derivatives such as N,N-bis(hydroxyalkyl)-alkylamines or -alkylenamines, polyethylene glycol esters and ethers, ethoxylated carboxylic esters and carboxamides, and glycerol monostearates and distearates, and also mixtures thereof.

17. Biocides can be a pesticide or an antimicrobial.

The at least one compound of the formula I is present in an amount of 0.001 to 5% by weight, preferably 0.01 to 3% by weight, for example 0.001 to 3%, 0.01 to 2%, 0.01 to 1.5% or 0.025 to 1%, relative to the weight of the polyamide.

The weight ratio of the compound of the formula (I) to the optional above described components, if present, is preferably 1:100 to 100:1, for example 1:90 to 90:1, 1:80 to 80:1, 1:70 to 70:1, 1:60 to 60:1, 1:50 to 50:1, 1:40 to 40:1, 1:30 to 30:1, 1:20 to 20:1, 1:10 to 10:1, 1:5 to 5:1, 1:4 to 4:1, 1:3 to 3:1, 1:2 to 2:1 or 1:1.

Also part of the invention is the use of a compound of the formula I as haze reducing agent for a polyamide polymer composition. The haze-value can be reduced for example by at least 5%, preferably 10%, more preferably 15% and in particular 20% compared to a reference polymer composition without a compound of the formula I, measured with the method according to ASTM D1003. Also part of the invention is the use of a compound of the formula I as clarity increasing agent for a polyamide polymer composition. The clarity-value can be increased for example by at least 5%, preferably 10%, more preferably 15% and in particular 20% compared to a reference polymer composition without a compound of the formula I, measured with the method according to ASTM 01003, in the concentration range of 0.001 to 3% by weight, relative to the weight of the polyamide polymer. Also part of the invention is the use of a compound of the formula I as laser transparency increasing agent for a polyamide polymer composition. The laser transparency value can be increased for example by at least 1%, preferably 3%, more preferably 5% and in particular 10% compared to a reference polymer composition without a compound of the formula I, in the concentration range of 0.001 to 3% by weight, relative to the weight of the polyamide polymer, the laser transparency being measured at 1064 nm.

Also part of the invention is the use of a compound of the formula I as haze reducing agent and clarity increasing agent for a polyamide polymer composition. For example, the haze-value is reduced by at least 5% and the clarity-value is increased by at least 5% compared to a reference polymer composition without an additive of the formula I, measured with the method according to ASTM D1003, in the concentration range of 0.001 to 3% by weight, relative to the weight of the polyamide polymer.

Also part of the invention is the use of a compound of the formula (I) as haze reducing agent and laser transparency increasing agent for a polyamide polymer composition. For example, the haze-value is reduced by at least 5%, measured with the method according to ASTM D1003 and the laser transparency-value is increased by at least 1%, preferably 3%, compared to a reference polymer composition without an additive of the formula I, in the concentration range of 0.001 to 3% by weight, relative to the weight of the polyamide polymer, the laser transparency being measured at 1064 nm.

The at least one compound of the formula I and optional further components may be added to the polyamide polymer individually or mixed with one another. If desired, the individual additives can be mixed with one another for example in the melt (melt blending) before incorporation into the polyamide polymer.

The incorporation of the compound of formula I and optional further components into polyamide polymer composition is carried out by known methods such as dry mixing in the form of a powder, or wet mixing in the form of solutions or suspensions. The at least one compound of the formula I and optional further components may be incorporated, for example, before or after molding or also by applying the dissolved or dispersed compound of formula I and optional further components to the polyamide polymer, with or without subsequent evaporation of the solvent. The at least one compound of formula I and optional further additives may be added direct into the processing apparatus (e.g. extruders, internal mixers, etc), e.g. as a dry mixture or powder or as solution or melt.

The incorporation can be carried out in any heatable container equipped with a stirrer, e.g. in a closed apparatus such as a kneader, mixer or stirred vessel. Examples of processing of the compositions according to the present invention are: injection blow molding, extrusion, blow molding, extrusion blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion. The incorporation is preferably carried out in an extruder or in a kneader according to methods known in literature.

It is immaterial whether processing takes place in an inert atmosphere or in the presence of oxygen.

The at least one compound of the formula I and optional further components can also be added to the polyamide polymer in the form of a masterbatch which contains the components in a concentration of, for example, about 2.5% to about 25% by weight; in such operations, the polyamide polymer can be used in the form of powder, granules, solutions or suspensions The compositions may be formed into the shaped articles using any suitable melt-processing technique, such as injection molding, extrusion, blow molding, injection blow molding, thermoforming and the like.

The compositions of the present invention are suitable for the manufacture of a wide variety of articles where good optical properties are desirable. The polyamide polymer composition according to the present invention is used especially in the field of automotive, electrical, electronics and packaging applications. They can be used in the field of aggressive media.

Thus, part of the invention is also a shaped article comprising a polymer composition according the invention. The shaped article of the invention is usually a film, fiber, sheet, pipe, semi-finished product, granulate, container, blow-molded article or monofilament. The film can be a single layer film or a multilayer film or fibres.

Without intending to limit the generality of the foregoing, shaped articles formed from the compositions of the present invention can include sight windows for tanks or reservoirs, e.g. for fuel and/or oil, lids, filter housings, spectacle frames, spectacle glasses, lenses for technical devices, viewing glasses for heating techniques, filter cups for drinking water treatment, bottles, flowmeters for gases or liquid media, clock cases, wrist watch cases, lamp cases, reflectors for lamps, switches with back lights, cartridges or decorative parts.

Some compounds of the formula I are novel. Thus, the present invention also relates to a compound of the formula I

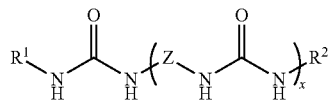

(I)

where
x is 1, 2 or 3;
$R^1$ and $R^2$ are, independently of each other, selected from hydrogen, linear $C_1$-$C_7$-alkyl, branched $C_3$-$C_{10}$-alkyl, unsubstituted or substituted $C_3$-$C_{12}$-cycloalkyl, unsubstituted or substituted $C_3$-$C_{10}$-cycloalkyl-$C_1$-$C_4$-alkyl, unsubstituted or substituted aryl and unsubstituted or substituted aryl-$C_1$-$C_4$-alkyl;
Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cycloalkylene, unsubstituted or substituted $C_5$-$C_8$-cycloalkylene-$C_1$-$C_4$-alkylene-$C_5$-$C_8$-cycloalkylene, unsubstituted or substituted heterocycloalkylene and unsubstituted or substituted heterocycloalkylene-$C_1$-$C_4$-alkylene-heterocycloalkylene
except for compounds, where
if $R^1$ and $R^2$ are identical and are hydrogen, tert-butyl, 2-ethylhexyl, 1-ethylpentyl, cyclohexyl or phenyl, and x is 1, Z is 1,4-cyclohexylene or
if $R^1$ and $R^2$ are both (R)-1-phenylethyl, and x is 1, Z is —$(CH_2)_9$—.

According to a specific aspect of this embodiment, the variables $R^1$, $R^2$, Z and n have the following meanings:
x is 1, 2 or 3;
$R^1$ and $R^2$ are, independently of each other, selected from linear $C_1$-$C_7$-alkyl, branched $C_3$-$C_{10}$-alkyl, unsubstituted or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl;
Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cycloalkylene, unsubstituted or substituted $C_5$-$C_8$-cycloalkylene-$C_1$-$C_4$-alkylene-$C_5$-$C_8$-cycloalkylene, unsubstituted or substituted heterocycloalkylene and unsubstituted or substituted heterocycloalkylene-$C_1$-$C_4$-alkylene-heterocycloalkylene.

The present invention is now illustrated in further detail by the following examples. However, the purpose of the following examples is only illustrative and is not intended to limit the present invention to them.

Preparation of Compounds of the Formula I

I.1 Compounds of the Formula I, where x=1 and $R^1$=$R^2$

Example 1

1,1'-(trans-1,4-cyclohexylene)bis(3-(tert-butyl)urea)

A solution of tert-butylisocyanate (3.90 g, 0.039 mol) in dry tetrahydrofuran (THF) (50 mL) was added slowly to a solution of trans-1,4-diaminocyclohexane (2.10 g, 0.019 mol) in dry THF (100 mL) under inert atmosphere. The resulting mixture was heated to reflux and stirred for 24 h. The precipitate was filtrated and washed with additional dry THF. The resulting white solid was recrystallized from N,N-dimethylformamide (DMF) and dried under high vacuum.
MS (70 eV): 312 ($M^+$)

Example 2

1,1'-(trans-1,4-cyclohexylene)bis(3-(cyclohexyl)urea)

A solution of cyclohexyl isocyanate (5.49 g, 0.044 mol) in dry THF (50 mL) was added slowly to a solution of trans-1,4-diaminocyclohexane (2.51 g, 0.022 mol) in dry THF (100 mL) under inert atmosphere. The resulting mixture was heated to reflux and stirred for 24 h. The precipitate was filtrated and washed with additional dry THF. The resulting white solid was recrystallized from DMF and dried under high vacuum.
MS (70 eV): 364 ($M^+$)

Example 3

1,1'-(trans-1,4-cyclohexylene)bis(3-(iso-propyl)urea)

A solution of isopropylamine (1.25 g, 0.022 mol) in dry THF (50 mL) was added slowly to a solution of trans-1,4-cyclohexane diisocyanate (1.75 g, 0.011 mol) in dry THF (100 mL) under inert atmosphere. The resulting mixture was heated to reflux and stirred for 24 h. The precipitate was filtrated and washed with additional dry THF. The resulting white solid was recrystallized from DMF and dried under high vacuum.

MS (70 eV): 284 (M$^+$)

Example 4

1,1'-(trans-1,4-cyclohexylene)bis(3-(1-ethylpropyl) urea)

A solution of 3-aminopentane (2.20 g, 0.025 mol) in dry THF (50 mL) was added slowly to a solution of trans-1,4-cyclohexane diisocyanate (2.00 g, 0.012 mol) in dry THF (100 mL) under inert atmosphere. The resulting mixture was heated to reflux and stirred for 24 h. The precipitate was filtrated and washed with additional dry THF. The resulting white solid was recrystallized from DMF and dried under high vacuum.

MS (70 eV): 340 (M$^+$)

Example 5

1,1'-(cis-1,4-cyclohexylene)bis(3-(cyclohexyl)urea)

A solution of isocyanatocyclohexane (3.25 g, 0.026 mol) in dry THF (50 mL) was added slowly to a solution of cis-1,4-cyclohexanediamine (1.50 g, 0.013 mol) in dry THF (100 mL) under inert atmosphere. The resulting mixture was heated to reflux and stirred for 24 h. The precipitate was filtrated and washed with additional dry THF. The resulting white solid was recrystallized from MeOH and dried under high vacuum.

Melting point: 252° C.
MS (70 eV): 364 (M$^+$)

Example 6

1,1'-(cis-1,4-cyclohexylene)bis(3-(tert-butyl)urea)

A solution of tert-butylisocyanate (2.57 g, 0.026 mol) in dry THF (50 mL) was added slowly to a solution of cis-1,4-cyclohexanediamine (1.50 g, 0.013 mol) in dry THF (100 mL) under inert atmosphere. The resulting mixture was heated to reflux and stirred for 24 h. The precipitate was filtrated and washed with additional dry THF. The resulting white solid was recrystallized from MeOH and dried under high vacuum.

Melting point: 319° C.
MS (70 eV): 312 (M$^+$)

The compounds of Examples 7 to 13 were prepared in an analogous manner.

Example 7

1,1'-(trans-1,4-cyclohexylene)bis(3-(1,1-dimethylpropyl)urea)

MS (70 eV): 340 (M$^+$)

Example 8

1,1'-(trans-1,4-cyclohexylene)bis(3-(tert-octyl)urea)

MS (70 eV): 426 (M$^+$)

Example 9

1,1'-(trans-1,4-cyclohexylene)bis(3-(1,5-dimethylhexyl)urea)

MS (70 eV): 425 (M$^+$)

Example 10

1,1'-(trans-1,4-cyclohexylene)bis(3-(1-adamantyl) urea)

MS (70 eV): 468 (M$^+$)

Example 11

1,1'-(trans-1,4-cyclohexylene)bis(3-n-butylurea)

Melting point: 358° C.
MS (70 eV): 312 (M$^+$)

Example 12

1,1'-(trans-1,4-cyclohexylene)bis(3-(n-propyl)urea)

MS (70 eV): 284 (M$^+$)

Example 13

1,1'-(trans-1,4-cyclohexylene)bis(3-(ethyl)urea)

MS (70 eV): 256 (M$^+$)

Example 14

(4-ureidocyclohexyl)urea

Trans-1,4-diaminocyclohexane (2.10 g, 0.019 mol) was dissolved in water (40 mL). The solution was brought to pH 5-7 by the addition of HCl. 3.30 g of potassium cyanate was added slowly under stirring. The resulting mixture was heated to reflux and stirred for 24 h. The precipitate was filtrated and washed with additional water. The resulting white solid was dried under high vacuum.

I.2. Compounds of the Formula I, where x=1 and R$^1$ is Different from R$^2$

Example 15

1-tert-butyl-3-[4-(cyclohexylcarbamoylamino)cyclohexyl]urea 15.1 trans-1-(4-aminocyclohexyl)-3-cyclohexylurea A solution of trans-1,4-diaminocyclohexane (6.15 g, 0.054 mol) in dry THF (500 mL) was cooled to −40° C. in a cooling bath (isopropyl alcohol/dry ice) under inert atmosphere. Isocyanatocyclohexane (6.75 g, 0.054 mol) in dry THF (100 mL) was added slowly under heavy stirring. The resulting mixture was stirred for another 24 h at room temperature. The precipitating white solid was filtrated, suspended in water and acidified to pH 2 (HCl). The emerging clear solution was again filtrated and the filtrate was brought to pH 8 (NaOH) whereupon trans-1-(4-aminocyclohexyl)-3-cyclohexylurea precipitated as a white solid.

15.2 1-tert-butyl-3-[4-(cyclohexylcarbamoylamino)cyclohexyl]urea

A solution of tert-butylisocyanate (1.17 g, 0.012 mol) in dry N-methyl-2-pyrrolidone (NMP) (50 mL) was added slowly to a solution of trans-1-(4-aminocyclohexyl)-3-cyclohexylurea (2.83 g, 0.012 mol) in dry NMP (100 mL) under inert atmosphere. The resulting mixture was heated to 70° C. and stirred for 24 h. The solution was precipitated in 1 M HCl and filtered off. The resulting white solid was washed with THF, recrystallized from DMF and dried under high vacuum.

Melting point: 325° C.
MS (70 eV): 338 (M$^+$)

I.3 Compounds of the formula I, where x=2 and $R^1=R^2$

Example 16

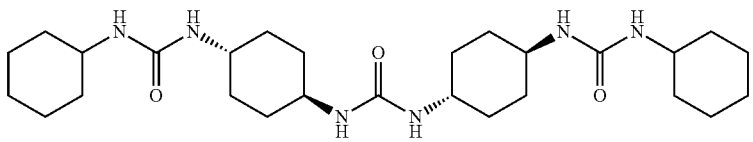 [SMILES: O=C(NC1CCCCC1)N[C@H]1CC[C@H](NC(=O)N[C@H]2CC[C@H](NC(=O)NC3CCCCC3)CC2)CC1]

16.1 trans-1-(4-aminocyclohexyl)-3-cyclohexylurea

Trans-1,4-diaminocyclohexane (6.15 g, 0.054 mmol) was added in a flame dried Schlenk flask and dissolved in THF (500 mL) under argon atmosphere. The solution was cooled to −40° C. in a cooling bath (isopropyl alcohol/dry ice) and cyclohexyl isocyanate (6.75 g, 0.054 mmol), diluted in THF (100 mL), was added slowly under heavy stirring. The reaction mixture was stirred for 12 h at room temperature. The precipitated white solid was filtered off, suspended in water and acidified to pH 2 (HCl). The emerging clear solution was again filtrated and the filtrate was brought to pH 8 (NaOH) whereupon the trans-1-(4-aminocyclohexyl)-3-cyclohexylurea precipitated as a white solid.

16.2

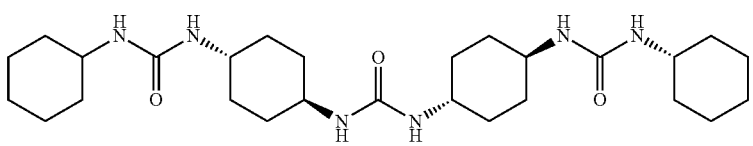

A flask was charged with trans-1-(4-aminocyclohexyl)-3-cyclohexylurea in THF and phosgene was bubbled in. After completion of the reaction, excess phosgene and the solvent were removed under reduced pressure to give the title compound.

I.4 Compounds of the Formula I, where x=3 and $R^1=R^2$

Example 17

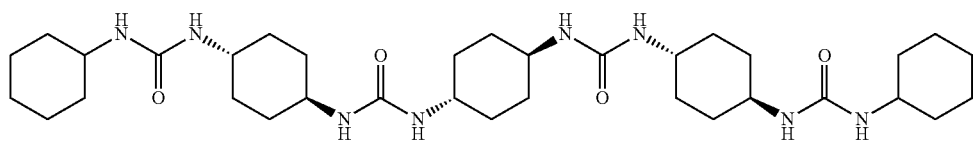 [SMILES: O=C(NC1CCCCC1)N[C@H]1CC[C@H](NC(=O)N[C@H]2CC[C@H](NC(=O)N[C@H]3CC[C@H](NC(=O)NC4CCCCC4)CC3)CC2)CC1]

Trans-1-(4-aminocyclohexyl)-3-cyclohexylurea (3.2 g, 13 mmol) was added in a flame dried Schlenk flask and dissolved in NMP under argon atmosphere. Trans-1,4-cyclohexane diisocyanate (1 g, 6 mmol) diluted in NMP was added slowly under heavy stirring. The resulting mixture was heated to 80° C. and stirred for 12 h. The solution was precipitated in 1M HCl and filtered off. The resulting white solid was washed with THF and dried under vacuum for 2 h (70° C., 100 mbar).

MS (70 eV): 265 ($M^+$)

The following general procedures were used in the working examples unless otherwise noted.

Mixing Procedure:

Powdered polyamide and the urea compounds of the formula I were weighted exactly in a glass bottle at a concentration of 1.0% by weight. The composition was then tumble-mixed and blended for 24 hours at 40 to 45 rpm. The above mentioned powder was then compounded in a co-rotating twin-screw compounder (DSM Xplore) at a rotational speed of 50 rpm at a melt temperature of 250° C. under nitrogen for 5 minutes. Different concentrations were prepared by subsequently diluting the initial nucleating agent concentration with neat polyamide. Neat polyamide was treated in the same way to produce a blank control sample.

The following polyamides were used:

Ultramid® B27, available from BASF SE, Germany: PA 6 grade

Ultramid® A27E1, available from BASF SE, Germany: PA 66 grade

PA 66/6 (90/10)

Ultramid® C33, available from BASF SE, Germany: PA 6/66 grade

Zytel® 1512, available from DuPont, Pa. 6/12 grade

Ultramid® S3K Balance, available from BASF SE, Germany: PA 6,10 grade.

Injection Molding:

Injection molding was performed on a DSM Xplore 12 ml injection molding machine. About 8.5 g of molten compound was filled directly into the barrel at 250° C. from the twin screw extruder under a nitrogen blanket. The melt was injected into a polished mold with a pressure of about 6 bar. The mold temperature was 100° C. The collected specimens had a diameter of 25 mm.

Polymer Crystallization Temperature

The crystallization behaviour of the various mixtures and control samples were determined by differential scanning calorimetry (DSC) on a Perkin Elmer Diamond DSC under nitrogen. Two heating and cooling scans between 50° C. and 250° C. were performed at standard rates of 10° C./min. To erase the thermal history, samples were held at 250° C. for 5 minutes before each cooling run. Values for the polymer crystallization (Tc) were determined at the exothermic minimum of the second cooling scan.

Optical Characterization (Haze, Clarity):

Haze and Clarity were measured with a haze-guard plus instrument (BYK, Gardner®, illumination CIE-E) at room temperature. The haze-guard plus instrument confirms to ASTM D-1003. The haze and clarity values were measured between 12 to 24 h after obtaining the specimens from injection molding. The measured samples had a diameter of 25 mm.

Laser Transparency Measurement

Laser transmittance was determined at wavelength 1064 nm by means of thermoelectric power measurement. The measurement geometry was set up as follows: a beam divider (SQ2 non-polarizing beam divider from Laseroptik GmbH) was used to divide a reference beam of power 1 watt at an angle of 90° from a laser beam (diode-pumped Nd-YAG laser with wavelength 1064 nm, FOBA DP50) with total power of 2 watts. The reference beam impacted the reference sensor. That portion of the original beam that passed through the beam divider provides the measurement beam likewise with power of 1 watt. This beam was focused to a focal diameter of 0.18 µm via a mode diaphragm (5.0) behind the beam divider. The laser transparency (LT) measurement sensor was positioned 80 mm below the focus. The test sheet was positioned 2 mm above the LT measurement sensor. Injection-molded test sheets are used, with dimensions 60*60*2 $mm^3$ and with edge gating. The measurement was made in the middle of the sheet (point of intersection of the two diagonals). The injection-molding parameters were set to the following values:

| | Melt temp. [° C.] | Mold temp. [° C.] | Injection rate [$cm^3/s$] | Hold pressure [bar] |
|---|---|---|---|---|
| reference composition | 260 | 80 | 48 | 600 |
| inventive composition | 260 | 80 | 48 | 600 |

The total measurement time was 30 s, and the result of the measurement is determined within the final 5 s. The signals from the reference sensor and measurement sensor were recorded simultaneously. The measurement process begins with insertion of the specimen.

Transmittance, and therefore laser transparency, was obtained from the following formula:

$$LT=(\text{Signal(measurement sensor)}/\text{Signal(reference sensor)})\times 100\%.$$

This measurement method excluded variations in the laser system and subjective read-out errors.

The average LT value for a sheet was calculated from at least five measurements. For each material, the average value was calculated on 10 sheets. The average values from the measurements on the individual sheets were used to calculate the average value, and also the standard deviation, for the material.

Results:

The crystallization temperature ($T_c$), haze and clarity of the polyamide composition as well as the thickness of the test specimen (plate) and the concentration of the compound of the formula I according to the present invention are listed in the following tables I to XVI.

TABLE I

| Additive according to the present invention | PA | Concentration [% by weight] | $T_c$ [° C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis-(3-tert-butylurea,) compound of example 1 | PA 6 | 1.0 | 194.0 | 20.0 | 97.7 | 1.1 |
| | PA 6 | 0.8 | 193.7 | 19.7 | 97.1 | 1.1 |
| | PA 6 | 0.6 | 193.8 | 24.5 | 97.4 | 1.1 |
| | PA 6 | 0.4 | 193.6 | 33.5 | 97.8 | 1.1 |
| | PA 6 | 0.2 | 193.6 | 46.6 | 97.1 | 1.1 |
| | PA 6 | 0.1 | 193.3 | 51.2 | 97.9 | 1.1 |
| | PA 6 | 0.05 | 192.8 | 70.2 | 97.1 | 1.1 |
| | PA 6 | 0.025 | 192.2 | 77.8 | 97.5 | 1.1 |

TABLE II

| Additive according to the present invention | PA | Concentration [% by weight] | $T_c$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-cyclohexylurea), compound of example 2 | PA 6 | 1.0 | 192.8 | 64.4 | 96.1 | 1.1 |
| | PA 6 | 0.8 | 193.1 | 68.5 | 96.4 | 1.1 |
| | PA 6 | 0.6 | 193.3 | 72.8 | 97.0 | 1.1 |
| | PA 6 | 0.4 | 193.3 | 76.6 | 96.1 | 1.1 |
| | PA 6 | 0.2 | 193.1 | 84.0 | 96.2 | 1.1 |
| | PA 6 | 0.1 | 192.3 | 88.9 | 93.7 | 1.1 |
| | PA 6 | 0.05 | 191.9 | 92.5 | 94.5 | 1.1 |
| | PA 6 | 0.025 | 190.9 | 95.8 | 91.6 | 1.1 |

TABLE III

| Additive according to the present invention | PA | Concentration [% by weight] | $T_{ct}$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-isopropylurea), compound of example 3 | PA 6 | 1.0 | 192.8 | 42.0 | 97.1 | 1.1 |
| | PA 6 | 0.8 | 192.3 | 45.6 | 96.8 | 1.1 |
| | PA 6 | 0.6 | 192.8 | 51.3 | 97.7 | 1.1 |
| | PA 6 | 0.4 | 193.1 | 59.4 | 97.3 | 1.1 |
| | PA 6 | 0.2 | 192.8 | 68.2 | 97.2 | 1.1 |
| | PA 6 | 0.1 | 192.6 | 76.3 | 96.9 | 1.1 |
| | PA 6 | 0.05 | 192.4 | 85.9 | 96.4 | 1.1 |
| | PA 6 | 0.025 | 191.9 | 87.8 | 94.8 | 1.1 |

TABLE IV

| Additive according to the present invention | PA | Concentration [% by weight] | $T_c$ [°C.] | Haze [%] | Clarity [%] | Thickness [mm] |
|---|---|---|---|---|---|---|
| none | PA 6 | — | 186.5 | 98.2 | 68.4 | 1.1 |
| 1,1'-(trans-1,4-cyclohexylene)bis(3-1-ethylpropylurea), compound of example 4 | PA 6 | 1.0 | 191.4 | 36.1 | 96.9 | 1.1 |
| | PA 6 | 0.8 | 191.9 | 43.0 | 97.3 | 1.1 |
| | PA 6 | 0.6 | 192.1 | 50.9 | 97.4 | 1.1 |
| | PA 6 | 0.4 | 192.2 | 61.8 | 97.0 | 1.1 |
| | PA 6 | 0.2 | 192.2 | 71.3 | 97.4 | 1.1 |
| | PA 6 | 0.1 | 192.5 | 79.0 | 95.6 | 1.1 |
| | PA 6 | 0.05 | 192.2 | 84.9 | 95.3 | 1.1 |
| | PA 6 | 0.025 | 191.6 | 89.0 | 94.4 | 1.1 |

TABLE V

| Additive according to the present invention | PA | Concentration [% by weight] | $T_{cryst}$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-(1,1-dimethylpropyl)-urea), compound from example 7 | PA 6 | 1.5 | 194.3 | 11.4 | 97.0 | 1.1 |
| | PA 6 | 1.3 | 194.2 | 12.4 | 97.6 | 1.1 |
| | PA 6 | 1.0 | 194.3 | 16.4 | 97.7 | 1.1 |
| | PA 6 | 0.8 | 194.4 | 21.9 | 97.9 | 1.1 |
| | PA 6 | 0.6 | 193.9 | 30.4 | 96.8 | 1.1 |
| | PA 6 | 0.4 | 194.1 | 40.8 | 97.8 | 1.1 |
| | PA 6 | 0.2 | 194.4 | 54.1 | 97.7 | 1.1 |
| | PA 6 | 0.1 | 193.9 | 66.1 | 97.7 | 1.1 |
| | PA 6 | 0.05 | 193.4 | 73.8 | 97.4 | 1.1 |
| | PA 6 | 0.025 | 192.9 | 80.8 | 96.7 | 1.1 |

TABLE VI

| Additive according to the present invention | PA | Concentration [% by weight] | $T_{cryst}$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-(tert-octyl)urea), compound from example 8 | PA 6 | 1.5 | 192.1 | 27.8 | 93.8 | 1.1 |
| | PA 6 | 1.3 | 192.3 | 28.9 | 93.7 | 1.1 |
| | PA 6 | 1.0 | 192.1 | 28.0 | 92.5 | 1.1 |
| | PA 6 | 0.8 | 192.1 | 26.2 | 93.9 | 1.1 |
| | PA 6 | 0.6 | 191.9 | 33.4 | 94.4 | 1.1 |
| | PA 6 | 0.4 | 192.2 | 42.1 | 95.4 | 1.1 |
| | PA 6 | 0.2 | 192.3 | 55.5 | 96.4 | 1.1 |
| | PA 6 | 0.1 | 191.9 | 66.5 | 96.3 | 1.1 |
| | PA 6 | 0.05 | 191.7 | 77.6 | 96.8 | 1.1 |
| | PA 6 | 0.025 | 190.9 | 80.7 | 97.0 | 1.1 |

TABLE VII

| Additive according to the present invention | PA | Concentration [% by weight] | $T_{cryst}$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-(1,5-dimethylhexyl)urea), compound from example 9 | PA 6 | 1.5 | 192.4 | 28.3 | 96.8 | 1.1 |
| | PA 6 | 1.3 | 191.8 | 22.1 | 97.0 | 1.1 |
| | PA 6 | 1.0 | 193.8 | 24.4 | 96.9 | 1.1 |
| | PA 6 | 0.8 | 193.5 | 28.3 | 97.0 | 1.1 |
| | PA 6 | 0.6 | 193.3 | 36.2 | 97.3 | 1.1 |
| | PA 6 | 0.4 | 193.5 | 50.4 | 96.9 | 1.1 |
| | PA 6 | 0.2 | 192.8 | 63.2 | 97.2 | 1.1 |
| | PA 6 | 0.1 | 192.9 | 72.1 | 96.9 | 1.1 |
| | PA 6 | 0.05 | 191.8 | 81.0 | 95.9 | 1.1 |
| | PA 6 | 0.025 | 192.1 | 85.5 | 94.8 | 1.1 |

TABLE VIII

| Additive according to the present invention | PA | Concentration [% by weight] | $T_{cryst}$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-(1-adamantyl)urea), compound from example 10 | PA 6 | 1.5 | 192.5 | 15.9 | 97.4 | 1.1 |
| | PA 6 | 1.3 | 190.9 | 21.8 | 96.8 | 1.1 |
| | PA 6 | 1.0 | 193.4 | 28.2 | 97.3 | 1.1 |
| | PA 6 | 0.8 | 191.7 | 36.2 | 97.2 | 1.1 |
| | PA 6 | 0.6 | 192.7 | 46.5 | 97.1 | 1.1 |
| | PA 6 | 0.4 | 192.8 | 59.9 | 96.8 | 1.1 |
| | PA 6 | 0.2 | 192.5 | 70.9 | 96.9 | 1.1 |
| | PA 6 | 0.1 | 191.9 | 78.4 | 96.4 | 1.1 |
| | PA 6 | 0.05 | 192.2 | 83.7 | 96.1 | 1.1 |
| | PA 6 | 0.025 | 192.0 | 88.1 | 94.9 | 1.1 |

TABLE IX

| Additive according to the present invention | PA | Concentration [% by weight] | $T_{cryst}$ [°C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene)bis(3-n-butylurea), compound from example 11 | PA 6 | 1.0 | 192.7 | 50.8 | 97.3 | 1.1 |
| | PA 6 | 0.8 | 192.1 | 55.3 | 97.2 | 1.1 |
| | PA 6 | 0.6 | 193.0 | 60.2 | 97.5 | 1.1 |
| | PA 6 | 0.4 | 192.8 | 65.1 | 97.5 | 1.1 |
| | PA 6 | 0.2 | 192.2 | 71.2 | 96.8 | 1.1 |
| | PA 6 | 0.1 | 191.9 | 77.1 | 97.1 | 1.1 |
| | PA 6 | 0.05 | 191.8 | 83.2 | 96.1 | 1.1 |
| | PA 6 | 0.025 | 190.5 | 87.0 | 94.9 | 1.1 |

TABLE X

| Additive according to the present invention | PA | Concentration [% by weight] | $T_{cryst}$ [° C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene) bis(3-(n-propyl)urea), compound from example 12 | PA 6 | 1.5 | 194.0 | 40.6 | 96.5 | 1.1 |
| | PA 6 | 1.3 | 193.5 | 44.4 | 96.4 | 1.1 |
| | PA 6 | 1.0 | 193.8 | 52.2 | 97.1 | 1.1 |
| | PA 6 | 0.8 | 192.9 | 59.5 | 95.6 | 1.1 |
| | PA 6 | 0.6 | 193.9 | 65.6 | 96.8 | 1.1 |
| | PA 6 | 0.4 | 193.0 | 72.3 | 97.3 | 1.1 |
| | PA 6 | 0.2 | 193.7 | 78.8 | 95.9 | 1.1 |
| | PA 6 | 0.1 | 192.5 | 83.8 | 96.2 | 1.1 |
| | PA 6 | 0.05 | 192.7 | 89.0 | 92.5 | 1.1 |
| | PA 6 | 0.025 | 191.9 | 91.9 | 93.2 | 1.1 |

TABLE XI

| Additive according to the present invention | PA | Concentration [% by weight] | $T_{cryst}$ [° C.] | Haze [%] | Clarity [%] | Thickness [mm] |
|---|---|---|---|---|---|---|
| None | PA 6 | — | 186.5 | 98.2 | 68.4 | 1.1 |
| 1,1'-(trans-1,4-cyclohexylene) bis(3-(ethyl)urea), compound from example 13 | PA 6 | 1.5 | 194.2 | 46.5 | 97.3 | 1.1 |
| | PA 6 | 1.3 | 193.8 | 49.6 | 97.1 | 1.1 |
| | PA 6 | 1.0 | 194.1 | 55 | 97.3 | 1.1 |
| | PA 6 | 0.8 | 194.1 | 60.1 | 97.3 | 1.1 |
| | PA 6 | 0.6 | 194.2 | 65.0 | 97.4 | 1.1 |
| | PA 6 | 0.4 | 194.5 | 72.5 | 90.5 | 1.1 |
| | PA 6 | 0.2 | 194.2 | 78.4 | 96.8 | 1.1 |
| | PA 6 | 0.1 | 193.6 | 84.7 | 96.4 | 1.1 |
| | PA 6 | 0.05 | 193.4 | 87.9 | 95.5 | 1.1 |
| | PA 6 | 0.025 | 192.7 | 91.6 | 94.2 | 1.1 |

TABLE XII

| Additive according to the present invention | PA | Concentration [% by weight] | $T_{cryst}$ [° C.] | Haze [%] | Clarity [%] | Thickness [mm] |
|---|---|---|---|---|---|---|
| None | PA 6 | — | 186.5 | 98.2 | 68.4 | 1.1 |
| 1-tert-butyl-3-[4-(cyclohexyl-carbamoyl-amino)cyclo-hexyl]urea, compound of example 15 | PA 6 | 1.0 | 190.5 | 32.5 | 97.4 | 1.1 |
| | PA 6 | 0.8 | 190.0 | 36.8 | 97.9 | 1.1 |
| | PA 6 | 0.6 | 191.9 | 44.8 | 97.8 | 1.1 |
| | PA 6 | 0.4 | 191.5 | 54.6 | 97.6 | 1.1 |
| | PA 6 | 0.2 | 190.7 | 65.7 | 97.7 | 1.1 |
| | PA 6 | 0.1 | 191.5 | 75.4 | 97.2 | 1.1 |
| | PA 6 | 0.05 | 190.9 | 82.3 | 96.8 | 1.1 |
| | PA 6 | 0.025 | 189.1 | 86.8 | 96.2 | 1.1 |

TABLE XIII

| Additive according to the present invention | PA | Concentration [% by weight] | Haze [%] | Clarity [%] | Thickness [mm] |
|---|---|---|---|---|---|
| None | PA 6 | — | 98.2 | 68.4 | 1.1 |
| Compound from example 17 | PA 6 | 1.5 | 76.9 | 67.2 | 1.1 |
| | PA 6 | 1.3 | 76.3 | 69.9 | 1.1 |
| | PA 6 | 1.0 | 75.2 | 74.9 | 1.1 |
| | PA 6 | 0.8 | 74.6 | 77.4 | 1.1 |
| | PA 6 | 0.6 | 74.2 | 81.6 | 1.1 |
| | PA 6 | 0.4 | 75.2 | 85.9 | 1.1 |
| | PA 6 | 0.2 | 76.4 | 91.4 | 1.1 |
| | PA 6 | 0.1 | 83.0 | 93.6 | 1.1 |
| | PA 6 | 0.05 | 88.0 | 93.3 | 1.1 |
| | PA 6 | 0.025 | 91.2 | 92.9 | 1.1 |

TABLE XIV

| Additive according to the present invention | PA | Concentration [% by weight] | $T_{cryst}$ [° C.] | Haze [%] | Clarity [%] | Thickness [mm] |
|---|---|---|---|---|---|---|
| None | PA 6/66 | — | 159.0 | 22.6 | 96.7 | 1.1 |
| 1,1'-(trans-1,4-cyclohexylene) bis(3-(tert-butyl)urea), compound of example 1 | PA 6/66 | 1.5 | 172.8 | 6.1 | 96.1 | 1.1 |
| | PA 6/66 | 1.3 | 173.9 | 5.0 | 96.2 | 1.1 |
| | PA 6/66 | 1.0 | 167.9 | 7.4 | 97.8 | 1.1 |
| | PA 6/66 | 0.8 | 168.2 | 8.1 | 97.8 | 1.1 |
| | PA 6/66 | 0.6 | 167.3 | 11.8 | 97.7 | 1.1 |
| | PA 6/66 | 0.4 | 165.9 | 16.6 | 98.3 | 1.1 |
| | PA 6/66 | 0.2 | 166.1 | 24.6 | 98.7 | 1.1 |
| | PA 6/66 | 0.1 | 165.7 | 33.1 | 98.9 | 1.1 |
| | PA 6/66 | 0.05 | 165.4 | 42.5 | 98.7 | 1.1 |
| | PA 6/66 | 0.025 | 164.6 | 49.2 | 98.3 | 1.1 |

TABLE XV

| Additive according to the present invention | PA | Concentration [% by weight] | $T_{cryst}$ [° C.] | Haze [%] | Clarity [%] | Thickness [mm] |
|---|---|---|---|---|---|---|
| None | PA 66/6 | — | 213.2 | 97.5 | 76.7 | 1.1 |
| 1,1'-(trans-1,4-cyclohexylene) bis(3-tert-butylurea), compound of example 1 | PA 66/6 | 1.5 | 219.3 | 34.4 | 97.0 | 1.1 |
| | PA 66/6 | 1.3 | 219.3 | 25.2 | 97.2 | 1.1 |
| | PA 66/6 | 1.0 | 219.4 | 24.2 | 97.1 | 1.1 |
| | PA 66/6 | 0.8 | 220.0 | 25.2 | 96.4 | 1.1 |
| | PA 66/6 | 0.6 | 218.6 | 32.5 | 96.8 | 1.1 |
| | PA 66/6 | 0.4 | 218.4 | 44.1 | 96.7 | 1.1 |
| | PA 66/6 | 0.2 | 217.1 | 64.0 | 96.7 | 1.1 |
| | PA 66/6 | 0.1 | 216.4 | 79.1 | 96.7 | 1.1 |
| | PA 66/6 | 0.05 | 216.1 | 84.9 | 96.3 | 1.1 |
| | PA 66/6 | 0.025 | 215.5 | 89.0 | 96.8 | 1.1 |

TABLE XVI

| Additive according to the present invention | PA | Concentration [% by weight] | $T_{cryst}$ [° C.] | Haze [%] | Clarity [%] | Thickness [mm] |
|---|---|---|---|---|---|---|
| None | PA 6/12 | — | 190.8 | 74.6 | 86.7 | 1.1 |
| 1,1'-(trans-1,4-cyclo-hexylene) bis(3-(tert-butyl)urea), compound from example I | PA 6/12 | 1.5 | 192.0 | 46.4 | 96.5 | 1.1 |
| | PA 6/12 | 1.3 | 192.4 | 45.2 | 95.1 | 1.1 |
| | PA 6/12 | 1.0 | 191.7 | 41.0 | 97.2 | 1.1 |
| | PA 6/12 | 0.8 | 192.2 | 40.0 | 96.6 | 1.1 |
| | PA 6/12 | 0.6 | 192.1 | 37.9 | 96.7 | 1.1 |
| | PA 6/12 | 0.4 | 191.8 | 39.6 | 96.7 | 1.1 |
| | PA 6/12 | 0.2 | 192.0 | 45.8 | 96.9 | 1.1 |
| | PA 6/12 | 0.1 | 191.7 | 51.3 | 97.5 | 1.1 |
| | PA 6/12 | 0.05 | 191.5 | 53.9 | 97.5 | 1.1 |
| | PA 6/12 | 0.025 | 191.3 | 54.1 | 98.0 | 1.1 |

TABLE XVII

| Additive according to the present invention | PA | Concentration [% by weight] | $T_{cryst}$ [° C.] | Haze [%] | Clarity [%] | Thickness [mm] |
|---|---|---|---|---|---|---|
| None | PA 66 | — | 234.5 | 100.0 | 11.2 | 1.1 |
| 1,1'-(trans-1,4-cyclo-hexylene) bis(3-tert-butylurea), compound from example 1 | PA 66 | 1.5 | 239.9 | 53.3 | 90.1 | 1.1 |
| | PA 66 | 1.3 | 240.8 | 52.0 | 94.5 | 1.1 |
| | PA 66 | 1.0 | 240.2 | 58.4 | 95.4 | 1.1 |
| | PA 66 | 0.8 | 239.8 | 64.4 | 95.4 | 1.1 |
| | PA 66 | 0.6 | 238.2 | 82.3 | 95.2 | 1.1 |
| | PA 66 | 0.4 | 237.6 | 96.0 | 94.0 | 1.1 |
| | PA 66 | 0.2 | 236.8 | 99.8 | 88.3 | 1.1 |
| | PA 66 | 0.1 | 238.1 | 100.0 | 69.4 | 1.1 |

TABLE XVII-continued

| Additive according to the present invention | PA | Concentration [% by weight] | $T_{cryst}$ [°C.] | Haze [%] | Clarity [%] | Thickness [mm] |
|---|---|---|---|---|---|---|
| | PA 66 | 0.05 | 236.0 | 100.0 | 74.8 | 1.1 |
| | PA 66 | 0.025 | 235.8 | 100.0 | 47.6 | 1.1 |

TABLE XVIII

| Additive according to the present invention | PA | Concentration [% by weight] | Haze [%] | Clarity [%] | Thickness [mm] |
|---|---|---|---|---|---|
| None | PA6 | | 100.0 | 50.1 | 2.0 mm |
| | PA6/66 | | 96.5 | 93.6 | 2.0 mm |
| | PA6, 10 | | 89.1 | 96.8 | 2.0 mm |
| (4-ureido cyclohexyl)urea compound from example 14 | PA6 | 1 | 71.7 | 99.1 | 2.0 mm |
| | PA6/66 | 1 | 37.1 | 99.0 | 2.0 mm |
| | PA6, 10 | 1 | 61.8 | 99.2 | 2.0 mm |

The laser transparency of the polyamide composition as well as the thickness of the test specimen (plate) and the concentration of the compound of the formula I according to the present invention are listed in the following table XIX. The laser transparency of a comparison polyamide composition as well as the thickness of the test specimen (plate) and the concentration of the comparative compound Talc IT extra are listed in the following table XX. Talc IT extra is obtainable from Mondo Minerals.

TABLE XIX

| Additive according to the present invention | PA | Concentration [% by weight] | Laser transparency [%] | Thickness [mm] |
|---|---|---|---|---|
| None | PA 6 | — | 82.3 | 1.1 |
| 1,1'-(trans-1,4-cyclohexylene)bis(3-tert-butylurea), compound of example 1 | PA 6 | 1.0 | 86.9 | 1.1 |
| | PA 6 | 0.4 | 86.1 | 1.1 |
| | PA 6 | 0.2 | 84.2 | 1.1 |
| | PA 6 | 0.1 | 81.7 | 1.1 |
| | PA 6 | 0.05 | 79.9 | 1.1 |
| | PA 6 | 0.025 | 79.2 | 1.1 |
| | PA 6 | 0.0125 | 79.1 | 1.1 |

TABLE XX (Comparison)

| Additive not according to the present invention | PA | Concentration [% by weight] | Laser transparency [%] | Thickness [mm] |
|---|---|---|---|---|
| None | PA 6 | — | 82.3 | 1.1 |
| Talc IT Extra | PA 6 | 1.0 | 78.8 | 1.1 |
| | PA 6 | 0.4 | 79.4 | 1.1 |
| | PA 6 | 0.2 | 79.6 | 1.1 |
| | PA 6 | 0.1 | 80.0 | 1.1 |
| | PA 6 | 0.05 | 80.4 | 1.1 |
| | PA 6 | 0.025 | 81.2 | 1.1 |
| | PA 6 | 0.0125 | 82.3 | 1.1 |

As can be seen from tables XIX and XX, the laser transparency of the inventive polyamide composition is increased compared to conventional polyamide compositions comprising talc as nucleating agent.

Inventive compositions, reference and comparison compositions listed in table XXI below were prepared as described above. The results of the transparency measurement according to ASTM D 1003 of these compositions and also the laser transparency are compiled in table XXII below.

TABLE XXI

| | PA 6 [wt. %] | Compound from Example 1 [wt. %] | Antioxidans* [wt. %] | Calcium Stearate** | Talc IT Extra |
|---|---|---|---|---|---|
| Reference | 100 | — | — | — | — |
| IC 1 | 99.5 | 0.5 | — | — | — |
| IC 2 | 99.0 | 1.0 | — | — | — |
| IC 3 | 98.20 | 1.0 | 0.3 | 0.5 | — |
| CC 1 | 99.20 | — | 0.3 | 0.5 | — |
| CC2 | 99.50 | — | — | — | 0.5 |
| CC3 | 99.00 | — | — | — | 1.0 |
| CC4 | 98.20 | — | 0.3 | 0.5 | 1.0 |

*N,N'-hexane-1,6-diylbis[3-(3,5-di-tert-butyl-4-hydroxyphenyl)propanamide], CAS 23128-74-7
**Ceasit AV, Powder Flow Aid, from Baerlocher
IC Inventive composition
CC Comparison composition

TABLE XXII

| | Haze [%] (1 mm) | Clarity [%] (1 mm) | Transmission [%] | Laser transparency (1 mm) [%] | Laser transparency (2 mm) [%] |
|---|---|---|---|---|---|
| Reference | 91.9 | 93.2 | 80.8 | 85.0 | 70.7 |
| IC 1 | 55.1 | 99.4 | 76.0 | n.d. | n.d. |
| IC 2 | 19.1 | 99.6 | 81.0 | 86.9 | 79.3 |
| IC 3 | 30.1 | 99.2 | 79.3 | 86.5 | n.d. |
| CC 1 | 92.6 | 84.6 | 82.3 | 86.9 | n.d. |
| CC2 | 52.6 | 98.3 | 76.4 | n.d. | n.d. |
| CC3 | 49.0 | 96.8 | 77.0 | 82.5 | n.d. |
| CC4 | 32.6 | 98.2 | 77.1 | 82.8 | n.d. | n.d. not determined

As can be seen from table XXII, the inventive polyamide compositions blended with additives show improved optical properties selected from reduced haze, improved clarity and improved laser transmittance compared to comparison compositions without a compound of formula I.

The invention claimed is:

1. A polymer composition which comprises at least one polyamide polymer and at least one compound of the formula I

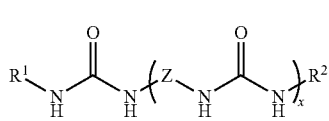

(I)

wherein x is 1;

$R^1$ and $R^2$ are, independently of each other, hydrogen, linear $C_1$-$C_7$-alkyl, branched $C_3$-$C_{10}$-alkyl, unsubstituted $C_3$-$C_{12}$-cycloalkyl, unsubstituted $C_3$-$C_{12}$-cycloalkyl-$C_1$-$C_4$-alkyl, unsubstituted aryl or unsubstituted aryl-$C_1$-$C_4$-alkyl; and Z is trans1,4-cyclohexanediyl, and wherein the compound of the formula I is present in an amount of 0.025 to 2% by weight relative to the weight of the polyamide polymer.

2. The composition according to claim 1, wherein $R^1$ and $R^2$ are, independently of each other, are linear $C_1$-$C_7$-alkyl, branched $C_3$-$C_{10}$-alkyl, unsubstituted $C_3$-$C_{12}$-cycloalkyl, unsubstituted $C_3$-$C_{12}$-cycloalkyl-$C_1$-$C_4$-alkyl, unsubstituted aryl or unsubstituted aryl-$C_1$-$C_4$-alkyl.

3. The composition according to claim 1, wherein $R^1$ and $R^2$ are, independently of each other, hydrogen, branched $C_3$-$C_{10}$-alkyl, $C_5$-$C_{12}$-cycloalkyl, or phenyl.

4. The composition according to claim 1, wherein $R^1$ and $R^2$ are, independently of each other, $C_3$-$C_{10}$-alkyl, which is attached to the skeleton via a secondary or tertiary carbon atom of the alkyl group, $C_5$-$C_{10}$-cycloalkyl which is unsubstituted, or phenyl.

5. The composition according to claim 1, wherein $R^1$ and $R^2$ have the same meaning.

6. The composition according to claim 1, wherein
$R^1$ and $R^2$ are identical and are tert-butyl, 1,1-dimethylpropyl, 1,5-dimethylhexyl, 1,1,3,3-tetramethylbutyl or 1-adamantyl; and
x is 1.

7. The composition according to claim 1, wherein the polyamide polymer is an aliphatic polyamide homopolymer, aliphatic polyamide copolymer or a partially aromatic polyamide.

8. The composition according to claim 1, wherein the polyamide polymer is PA 6, PA 7, PA 10, PA 11, PA 12, PA 66, PA 69, PA 610, PA 612, PA1010, PA 6/66, PA 66/6, PA 66/610 or mixtures thereof.

9. The composition according to claim 1, wherein the polyamide polymer is PA 6, PA 11, PA 12, PA 66, PA 66/6 or PA 6/66 and $R^1$ and $R^2$ are identical and are hydrogen, tert-butyl, 1,1-dimethylpropyl, 1,5-dimethylhexyl, 1,1,3,3-tetramethylbutyl or 1-adamantyl.

10. The composition according to claim 1, wherein the polymer composition additionally comprises at least one further additive selected from the group consisting of colorants, antioxidants, UV-absorber, light stabilizers, reinforcing materials, fillers, antifogging agents, mold release agents, biocides, antistatic agents and rheology modifier.

11. A method for improving at least one at least one optical property selected from increased clarity, increased laser transparency and reduced haze which comprises adding the compound of the formula I

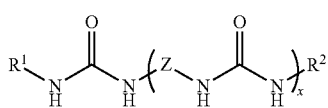
(I)

wherein
x is 1,
$R^1$ and $R^2$ are, independently of each other, hydrogen, linear $C_1$-$C_7$-alkyl, branched $C_3$-$C_{10}$-alkyl, unsubstituted $C_3$-$C_{12}$-cycloalkyl, unsubstituted $C_3$-$C_{12}$-cycloalkyl-$C_1$-$C_4$-alkyl, unsubstituted aryl or unsubstituted aryl-$C_1$-$C_4$-alkyl; and
Z is trans 1,4-cyclohexanediyl;
in a polymer composition comprising at least one semi-crystalline polyamide polymer and
wherein the compound of the formula I is present in an amount of 0.025 to 2% by weight relative to the weight of the polyamide polymer.

12. The method according to claim 11, wherein $R^1$ and $R^2$ are, independently of each other, hydrogen, branched $C_3$-$C_{10}$-alkyl, $C_5$-$C_{12}$-cycloalkyl or phenyl.

13. The method according to claim 11, wherein the polyamide polymer is an aliphatic polyamide homopolymer, aliphatic polyamide copolymer or a partially aromatic polyamide.

14. The method according to claim 13, wherein the polyamide polymer is PA 6, PA 7, PA 10, PA 11, PA 12, PA 66, PA 69, PA 610, PA 612, PA 1010, PA 6/66, PA 66/6 or PA 66/610.

15. The method according to claim 11, wherein the polyamide polymer is PA 6, PA 11, PA 12, PA 66, PA 66/6 or PA 6/66 and $R^1$ and $R^2$ are identical and are hydrogen, tert-butyl, 1,1-dimethylpropyl, 1,5-dimethylhexyl, 1,1,3,3-tetramethylbutyl or 1-adamantyl.

16. The method according to claim 11, wherein the haze-value is reduced by at least 5%, compared to a reference polymer composition without an additive of the formula I, the haze being measured at a plate of 1.1 mm thickness.

17. The method according to claim 11, wherein the clarity-value is increased by at least 5%, compared to a reference polymer composition without an additive of the formula I, the clarity being measured at a plate of 1.1 mm thickness.

18. The method according to claim 11, wherein the laser transparency value is increased by at least 1%, compared to a reference polymer composition without an additive of the formula I, measured at 1064 nm and at a plate of 1.1 mm thickness.

19. The method according to claim 11, wherein the haze-value is reduced by at least 5% and the clarity-value is increased by at least 5% compared to a reference polymer composition without an additive of the formula I, haze and clarity being measured at a plate of 1.1 mm thickness.

20. A shaped article comprising the polymer composition according to claim 1.

21. The shaped article according to claim 20 wherein the article is a film, fiber, sheet, pipe, semi-finished product, granulate, container, blow-molded article or monofilament.

* * * * *